(12) United States Patent
Ruhl et al.

(10) Patent No.: US 8,583,584 B2
(45) Date of Patent: *Nov. 12, 2013

(54) METHOD AND SYSTEM FOR USING WEB ANALYTICS DATA FOR DETECTING ANOMALIES

(75) Inventors: Jan Matthias Ruhl, San Francisco, CA (US); Douglas Van der Molen, Elmhurst, IL (US); Hui Sok Moon, San Jose, CA (US); Lik Mui, Hayward, CA (US); Japjit Tulsi, Los Altos, CA (US)

(73) Assignee: Google Inc., Mountain View, CA (US)

( * ) Notice: Subject to any disclaimer, the term of this patent is extended or adjusted under 35 U.S.C. 154(b) by 412 days.

This patent is subject to a terminal disclaimer.

(21) Appl. No.: 12/907,928

(22) Filed: Oct. 19, 2010

(65) Prior Publication Data
US 2011/0119226 A1    May 19, 2011

Related U.S. Application Data

(60) Provisional application No. 61/253,472, filed on Oct. 20, 2009.

(51) Int. Cl.
*G06F 9/44* (2006.01)

(52) U.S. Cl.
USPC .......................................................... 706/52

(58) Field of Classification Search
None
See application file for complete search history.

(56) References Cited

U.S. PATENT DOCUMENTS

| | | | |
|---|---|---|---|
| 5,870,746 A | 2/1999 | Knutson et al. | 707/101 |
| 6,317,787 B1 | 11/2001 | Boyd et al. | |
| 6,392,668 B1 | 5/2002 | Murray | |
| 6,581,054 B1 | 6/2003 | Bogrett | |
| 6,604,095 B1 | 8/2003 | Cesare et al. | |
| 6,850,933 B2 | 2/2005 | Larson et al. | |

(Continued)

FOREIGN PATENT DOCUMENTS

| | | | |
|---|---|---|---|
| KR | 10-0695467 B1 | 3/2007 | ............. G06F 17/00 |
| WO | WO 02/27528 A1 | 4/2002 | ............. G06F 17/00 |
| WO | WO 2006/133218 A2 | 12/2006 | ........... G06F 15/173 |
| WO | WO 2006/133219 A2 | 12/2006 | |

OTHER PUBLICATIONS

International Search Report and Written Opinion for International Application No. PCT/US2010/047341, mailed Dec. 16, 2010, 9 pages.

(Continued)

*Primary Examiner* — Alan Chen
*Assistant Examiner* — Paulinho E Smith
(74) *Attorney, Agent, or Firm* — Foley & Lardner LLP; John D. Lanza

(57) ABSTRACT

A server system stores web analytics data for a web page in a device. The web analytics data comprises a plurality of prior time-value pairs, each pair including a value of an attribute associated with the web page and a time associated with the value. For a particular attribute, the server system collects a new time-value pair including a new value associated with the web page and a new time indicating when the value was determined. The server system estimates a predicted value for the attribute and an associated error-variance at the new time by applying a forecasting model to the prior time-value pairs in respective subsets of the web analytics data. The collected new time-value pair is tagged if its value is outside the error variance of the predicted value for the particular attribute.

21 Claims, 31 Drawing Sheets

(56) References Cited

U.S. PATENT DOCUMENTS

| | | |
|---|---|---|
| 6,925,442 B1 | 8/2005 | Shapira et al. |
| 6,975,963 B2 | 12/2005 | Hamilton et al. |
| 7,085,682 B1 | 8/2006 | Heller et al. |
| 7,310,590 B1 * | 12/2007 | Bansal et al. ................. 702/181 |
| 7,464,122 B1 * | 12/2008 | Basko et al. ......................... 1/1 |
| 7,523,191 B1 | 4/2009 | Thomas et al. |
| 7,627,572 B2 | 12/2009 | Bohannon |
| 7,669,212 B2 | 2/2010 | Alao et al. |
| 7,673,340 B1 | 3/2010 | Cohen et al. |
| 7,716,011 B2 | 5/2010 | Thibaux et al. |
| 7,895,012 B2 | 2/2011 | Turicchi, Jr. |
| 2003/0158795 A1 | 8/2003 | Markham et al. |
| 2004/0054784 A1 | 3/2004 | Busch et al. |
| 2005/0114206 A1 | 5/2005 | Bennett et al. |
| 2006/0074905 A1 | 4/2006 | Yun et al. ........................... 707/5 |
| 2006/0074910 A1 | 4/2006 | Yun et al. ........................... 707/7 |
| 2006/0085741 A1 | 4/2006 | Weiner et al. |
| 2006/0184508 A1 | 8/2006 | Fuselier et al. |
| 2006/0189330 A1 | 8/2006 | Nelson et al. |
| 2006/0277197 A1 | 12/2006 | Bailey |
| 2006/0277585 A1 | 12/2006 | Error et al. |
| 2007/0112607 A1 | 5/2007 | Tien et al. |
| 2007/0185826 A1 | 8/2007 | Brice et al. |
| 2008/0140524 A1 | 6/2008 | Anand et al. |
| 2008/0184116 A1 | 7/2008 | Error |
| 2008/0208910 A1 | 8/2008 | MacIntyre et al. |
| 2008/0235075 A1 | 9/2008 | Couture et al. |
| 2008/0275980 A1 | 11/2008 | Hansen ......................... 709/224 |
| 2009/0063549 A1 | 3/2009 | Bhatia et al. |
| 2009/0198724 A1 | 8/2009 | Valimaki et al. |
| 2010/0030544 A1 * | 2/2010 | Gopalan et al. .................. 703/13 |
| 2010/0205029 A1 | 8/2010 | Asherman et al. |
| 2010/0287146 A1 | 11/2010 | Skelton et al. |
| 2011/0035272 A1 | 2/2011 | Bhatt et al. |

OTHER PUBLICATIONS

International Search Report and Written Opinion for PCT/US2010/053417 dated May 30, 2011, 8 pgs.

* cited by examiner

Data Records of Time Series 175

Edit an Alert

Alert name: revenue decrease

Apply to: www.googlestore.com

Period: Day ▼

☐ Email me when this alert is triggered

Alert Conditions

This applies to
All Traffic ▼

Alert me when          Condition                          Value        Compared to
Revenue ▼              % decreases by more than ▼         10   %       Same day in the previous week ▼

[ Save Alert ]   Cancel

FIG. 12E

METHOD AND SYSTEM FOR USING WEB ANALYTICS DATA FOR DETECTING ANOMALIES

PRIORITY

This application claims priority under 35 U.S.C. 119(e) to U.S. Provisional Patent Application 61/253,472 filed Oct. 20, 2009, which is hereby incorporated by reference in its entirety.

TECHNICAL FIELD

The disclosed embodiments relate generally to web analytics data mining, and in particular, to a system and method for detecting and displaying events of potential interest in time series data.

BACKGROUND

Web analytics is the measurement, collection, analysis and reporting of the traffic data of a web site for purposes such as understanding and optimizing web site usage. The traffic data is typically organized in the form of one or more multidimensional datasets whose metadata may include multiple dimensions and metric attributes (also known as "measures"). Conventional approaches typically generate multiple (sometimes hundreds of) reports by focusing on the factual aspects of the web traffic, e.g., by visualizing different subsets of a multidimensional dataset defined by various configurations of dimensions and metric attributes. From examining the visualized traffic data, a web analyst may be able to discover useful information for improving the quality and volume of the traffic to the web site. But this exercise of searching for useful information within the multidimensional dataset is non-trivial especially if the volume of the traffic data is significant or the metadata includes a large number of dimensions and metric attributes that may correspond to hundreds or even thousands of configurations. Because different configurations correspond to different factual aspects of the dataset, it is difficult to rank the configurations by their respective importance to the web analyst based on a well-accepted standard.

SUMMARY

In accordance with some embodiments described below, a computer-implemented method for detecting anomalies in time series data at a server system is disclosed. The server system is connected to one or more client devices through a network. The server system stores time series data for a data source. The time series data comprises a plurality of time-value pairs, each pair including a value of one or more attributes associated with the data source and a time associated with the value. For a particular attribute, the server system generates a plurality of forecasting models for characterizing the time-value pairs in a respective subset of the time series data, each forecasting model including an estimated attribute value and an associated error-variance. For a respective time-value pair associated with the particular attribute, the server system determines whether the value of the time-value pair is within the error-variance of the corresponding estimated attribute value and tags the time-value pair as an anomaly if the value of the time-value pair is outside the error variance for at least a first subset of the forecasting models. In response to a request from a client application for analytics information for the data source, the server system reports to the client application at least a subset of the time-value pairs tagged as anomalies for one or more of the attributes.

In accordance with some embodiments described below, a server system for identifying anomalies in time series data is disclosed. The server system is connected to one or more client devices through a network. The server system includes one or more processors for executing programs and memory to store data and to store one or more programs to be executed by the one or more processors. The one or more programs including instructions for: storing time series data for a data source, wherein the time series data comprises a plurality of time-value pairs, each pair including a value of one or more attributes associated with the data source and a time associated with the value; for a particular attribute, generating a plurality of forecasting models for characterizing the time-value pairs in a respective subset of the time series data, each model including an estimated attribute value and an associated error-variance; for a respective time-value pair associated with the particular attribute: determining whether the value of the time-value pair is within the error-variance of the corresponding estimated attribute value; and tagging the time-value pair as an anomaly if the value of the time-value pair is outside the error variance for at least a first subset of the forecasting models; and in response to a request from a client application for analytics information for the data source, reporting to the client application at least a subset of the time-value pairs tagged as anomalies for one or more of the attributes.

In accordance with some embodiments described below, a computer readable-storage medium stores one or more programs for execution by one or more processors of a server system. The server system is connected to one or more client devices through a network. The one or more programs include instructions for: storing time series data for a data source, wherein the time series data comprises a plurality of time-value pairs, each pair including a value of one or more attributes associated with the data source and a time associated with the value; for a particular attribute, generating a plurality of forecasting models for characterizing the time-value pairs in a respective subset of the time series data, each model including an estimated attribute value and an associated error-variance; for a respective time-value pair associated with the particular attribute: determining whether the value of the time-value pair is within the error-variance of the corresponding estimated attribute value; and tagging the time-value pair as an anomaly if the value of the time-value pair is outside the error variance for at least a first subset of the forecasting models; and in response to a request from a client application for analytics information for the data source, reporting to the client application at least a subset of the time-value pairs tagged as anomalies for one or more of the attributes.

In accordance with some embodiments described below, a graphical user interface is disclosed for presenting time series data and anomalies for a data source on a display of a client computer having a user input device. The graphical user interface includes a first window and a second window below the first window on the display. The first window on the display includes: a graph of time series data values for a first attribute for the data source, the graph having a time axis corresponding to a time range and a dependent data value axis, and a histogram of anomalies for the data source, each of the anomalies corresponding to a value of an attribute that is substantially different from an expected value of the attribute, the histogram having the same time axis scale as the graph and a dependent total anomalies axis. The height of a respective bar along the total anomalies axis represents a total number of anomalies for the data source at a corresponding time on the time axis. The second window on the display includes a list of automatic alerts characterizing a set of anomalies for the data source at a particular time on the time axis. The particular time is designated by a user via interaction with the graph through the user input device and each item of the list of automatic alerts corresponds to an anomaly associated with a respective attribute for the data source.

BRIEF DESCRIPTION OF DRAWINGS

The aforementioned embodiment of the invention as well as additional embodiments will be more clearly understood as a result of the following detailed description of the various aspects of the invention when taken in conjunction with the drawings. Like reference numerals refer to corresponding parts throughout the several views of the drawings.

FIGS. 12A to 12E are screenshots of graphical user interfaces that displays information relating to events of potential interest in accordance with some embodiments.

DESCRIPTION OF EMBODIMENTS

Reference will now be made in detail to embodiments, examples of which are illustrated in the accompanying drawings. While the invention will be described in conjunction with the embodiments, it will be understood that the invention is not limited to these particular embodiments. For example, although the embodiments below use web analytics for illustrative purposes. It will be apparent to those skilled in the art that the inventions disclosed in this application can be used to analyze almost any type of time series data regardless of whether the time series data is web-related or not. On the contrary, the invention includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

Figure 1A:
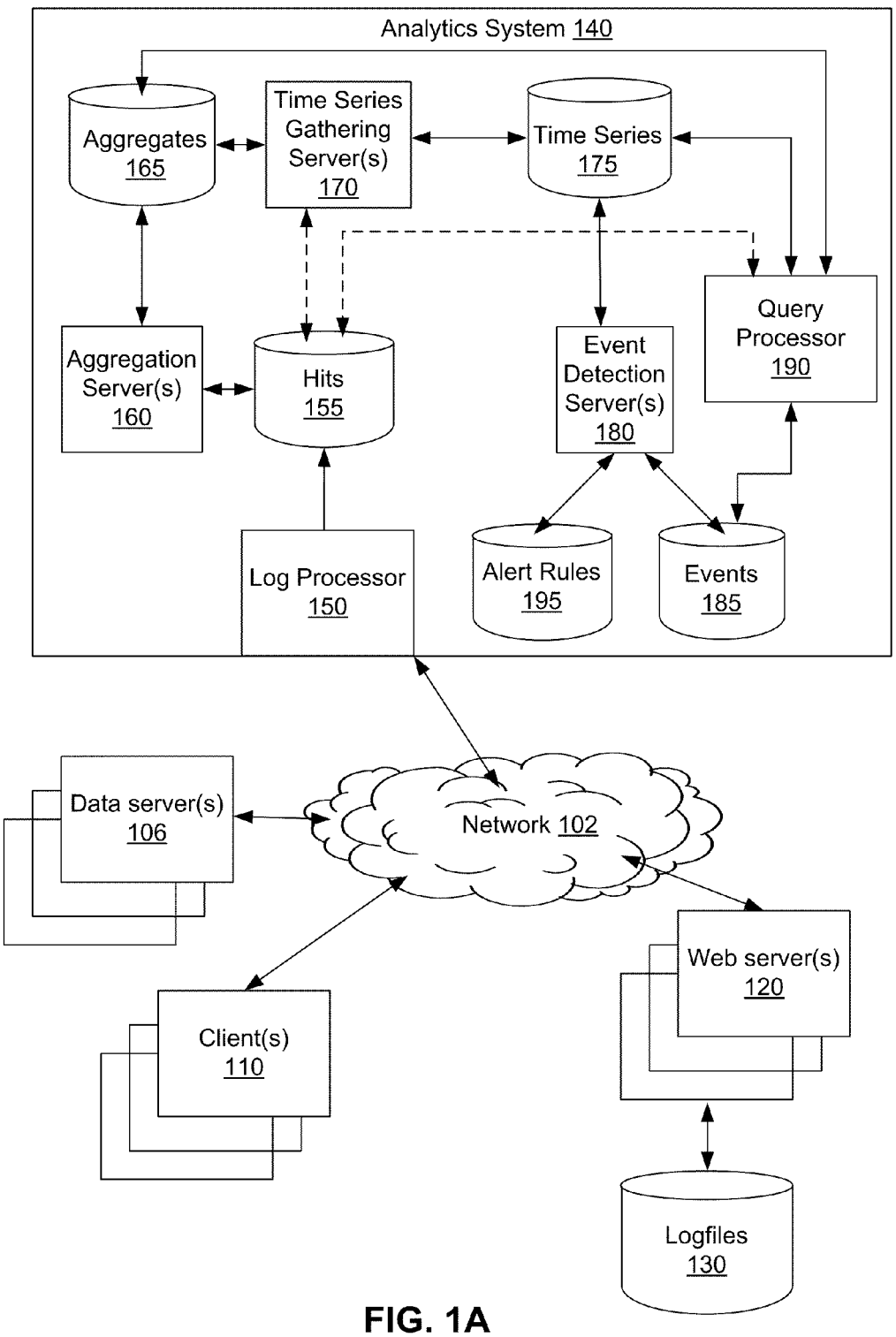
FIG. 1A is an overview block diagram of an analytics system for collecting web traffic data and performing web analytics on the data in accordance with some embodiments.

FIG. 1A illustrates a distributed computer system 100 in accordance with some embodiments. The distributed system 100 includes one or more web servers 120 that host web sites and serve web pages upon receiving requests from clients 110. In some embodiments, the web servers 120 collect web traffic data in logfiles 130. In some other embodiments, the web pages hosted by the web servers 120 include one or more embedded computer programs such as Javascript codes for capturing the web traffic data. When a user requests and downloads the web pages to a client 110, the embedded computer programs also reside in the client 110 and monitor the user's activities on the web pages. This approach can avoid some web caching-related issues and is sometimes referred to as "page tagging." In some embodiments, a web server 120 may employ both mechanisms for gathering web traffic data.

The distributed system 100 includes an analytics system 140 that includes a log processor 150 for extracting web page hit data from the logfiles 130 or receiving web page hit data captured by the embedded computer programs from the clients 110 and storing the hit data in a hits database 155. One or more aggregation servers 160 process the hit data and generate aggregated web analytics data that is stored in aggregates database 165. The time series gathering servers 170 extract or receive newly aggregated data from the aggregates database 165 and create or update a plurality of time series for each web site, which are stored in the time series database 175. In some embodiments, the time series gathering servers 170 also extract web analytics data from the hits database 155. One or more event detection servers 180 process the time series in the database 175 at regular time interval (e.g., nightly, weekly or monthly) to detect events of potential interest therein and store the events in the events database 185. In some embodiments, the event detection process is a rule-based one in which the event detection servers 180 extract user-specified alert rules from the alert rules database 195. The analytics system 140 includes a query processor 190 for accessing the aggregates database 165, the time series database 175, and the events database 185, and returning the query results as web analytics reports to users of the analytics system 140 (who use the analytics system to track the visitors' activities at one or more of their web sites). If the user-requested data has not been aggregated, the query processor 180 reads the raw hits data in real time and computes the desired aggregates from it.

In some embodiments, the analytics system 140 processes and returns a set of the web analytics reports that correspond to a desired data view specified by a user. In some embodiments, the analytics system 140 identifies those hits in the hits database 155 that are context-insensitive and processes these hits to incrementally update a first plurality of aggregate tables in the aggregates database 165. The analytics system 140 identifies those hits in the hits database 155 that are context-sensitive and processes these hits to incrementally update a second plurality of aggregate tables using the second context-sensitive entries, but only, at the end of the specified period of time, such as at the end of the day.

Doing so speeds up the incremental updates to more than 90% of the data, as discussed below.

The distributed system 100 also includes a plurality of data servers 106 that store one or more data structures, such as tables, that may be used by the analytics system 140 for storage. In some embodiments, the data servers 106 store the logfiles 130, the hit data 155, the aggregate data 165, the time series data 175, and/or the events data 185. In some embodiments, data servers 106 are clustered in a data center or in two or more interconnected data centers. In some embodiments, the distributed system 100 includes as many as 1000 data servers or more. The various components of the distributed system 100 are interconnected by a network 102. The network 102 may be any suitable network, including but not limited to a local area network (LAN), a wide-area network (WAN), the Internet, an Ethernet network, a virtual private network (VPN), or any combination of such networks. The network 102 can be wired or wireless. In some embodiments, the network 102 uses the HyperText Transport Protocol (HTTP) and the Transmission Control Protocol/Internet Protocol (TCP/IP) to transport information between different networks. The HTTP permits client devices to access various information items available on the Internet via the network 102. The various embodiments of the invention, however, are not limited to the use of any particular protocol.

Typically, where an individual visitor directly accesses a web page served by a web server 120, the log data entry (stored in one or more databases represented by logfiles 130 or captured by the computer program embedded in the web page) records multiple variables about the visits, typically including the IP address, the user agent, the web page viewed, the time and date that the web page was accessed and a status field. Each data entry in a log file represents a single "hit" on a file hosted by a web server 120, and consists of a number of fields (explained below in connection with FIG. 2). Any server request is considered a hit. For example, when a visitor calls up a web page with six images, that is seven hits—one for the page, and six for the images.

In other circumstances, the visitor may have employed a query in a search engine and the web-site under scrutiny was turned up in the search results. In such case, the corresponding entry in the log data may reveal a "reference" and the "search term" entered by the visitor. In some circumstances, the visitor is not an individual, but rather a software process such as an Internet robot, web crawler or spider, link checker, mirror agent, hacker, or other such entity used to systematically peruse vast amounts of data available via the network 102. The log data entry corresponding to such accesses may display an IP address, host name and/or user agent that may be associated with such entities.

Another type of data that may be recorded in a log file 130 is a session identifier or session ID, which is a unique identifier (such as, a fixed-length alphanumeric string) that a web server assigns to a specific user for the duration of that user's visit and that identifies the user's session (maybe a series of related message exchanges). Session identifiers become necessary in cases where the communications infrastructure uses a stateless protocol such as HTTP. For example, a buyer who visits a seller's web site wants to collect a number of articles in a virtual shopping cart and then finalize the shopping transaction by going to the site's checkout page. This typically involves an ongoing communication including several web pages requested by the client 110 and sent back by the server 120. In such a situation, it is vital to keep track of the current state of the shopper's cart, and a session ID is one way to achieve that goal.

A session ID is typically granted to a visitor on his first visit to a web site. It is different from a user ID because sessions are typically short-lived (they expire after a preset time of inactivity which may be minutes or hours) and may become invalid after a certain goal has been met (for example, once the buyer has finalized his order, he can not use the same session ID to add more items).

Figure 1B:
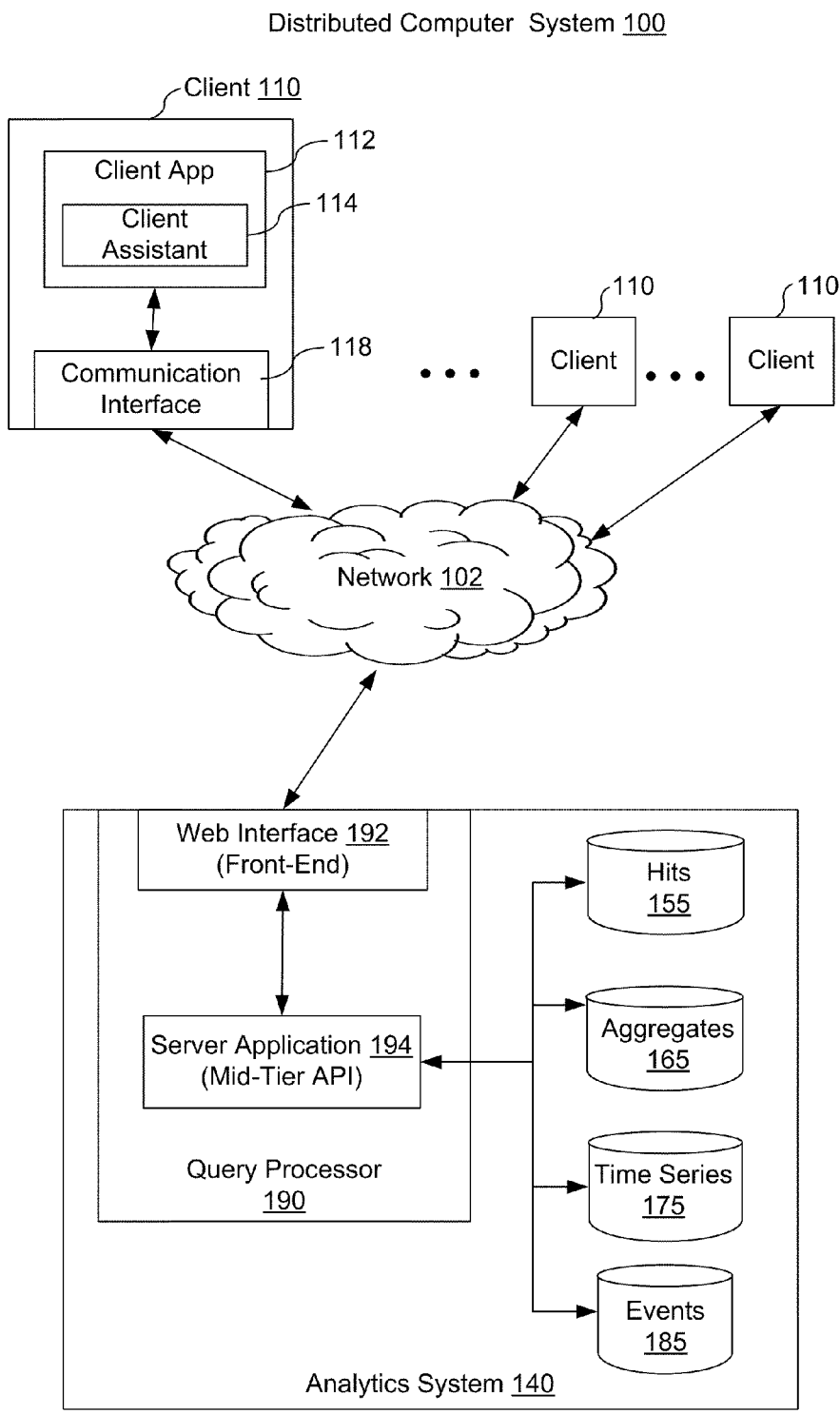
FIG. 1B is an overview block diagram of the analytics system for preparing and providing user-requested web analytics results to the users at different clients accordance with some embodiments.

FIG. 1B illustrates the distributed system 100 with an emphasis on the client-server interactions in accordance with some embodiments. A client 110 (also known as a "client device") may be any computer or similar device through which a user of the client 110 can submit data access requests to and receive results or other services from the analytics system 140. Examples include, without limitation, desktop computers, laptop computers, tablet computers, mobile devices such as mobile phones, personal digital assistants, set-top boxes, or any combination of the above. A respective client 110 may contain at least one client application 112 for submitting requests to the analytics system 140. For example, the client application 112 can be a web browser or other type of application that permits a user to access the services provided by the analytics system 140.

In some embodiments, the client application 112 includes one or more client assistants 114. A client assistant 114 can be a software application that performs tasks related to assisting a user's activities with respect to the client application 112 and/or other applications. In some embodiments, a client assistant 114 includes a local copy of the executable version of the embedded computer programs for collecting web analytics data relating to web pages from a particular web site. For example, the client assistant 114 may assist a user at the client 110 with browsing information (e.g., web pages), processing information (e.g., query results) received from the analytics system 140, and monitoring the user's activities on the query results. In some embodiments, the client assistant 114 is embedded in a web page (e.g., a query results web page) or other documents downloaded from the analytics system 140. In some embodiments, the client assistant 114 is a part of the client application 112 (e.g., a plug-in application of a web browser). The client 110 further includes a communication interface 118 to support the communication between the client 110 and other devices (e.g., the analytics system 140 or another client 110).

In some embodiments, the query processor 190 includes a web interface 192 (sometimes referred to as a "front-end server") and a server application 194 (sometimes referred to as a "mid-tier server" or "mid-tier API"). The web interface 192 receives data access requests from client devices 110 and forwards the requests to the server application 194. In response to receiving the requests, the server application 194 processes the requests including generating database queries associated with a request, applying the queries to different databases for data requested by the client, and returning the query results to the requesting clients 110. After receiving a result, the client application 112 at a particular client 110 displays the result to the user who submits the original request.

In some embodiments, each of the databases shown in FIGS. 1A and 1B is effectively a database management system including a database server that is configured to manage a large number of data records stored in the corresponding database. In response to a query submitted by the server application 194, the database server identifies zero or more data records that satisfy the query and returns the data records to the server application 194 for further processing. In some embodiments, the analytics system 140 is an application service provider (ASP) that provides web analytics services to its customers (e.g., a web site owner) by visualizing the web traffic data generated at a web site in accordance with various user requests.

Figure 2:
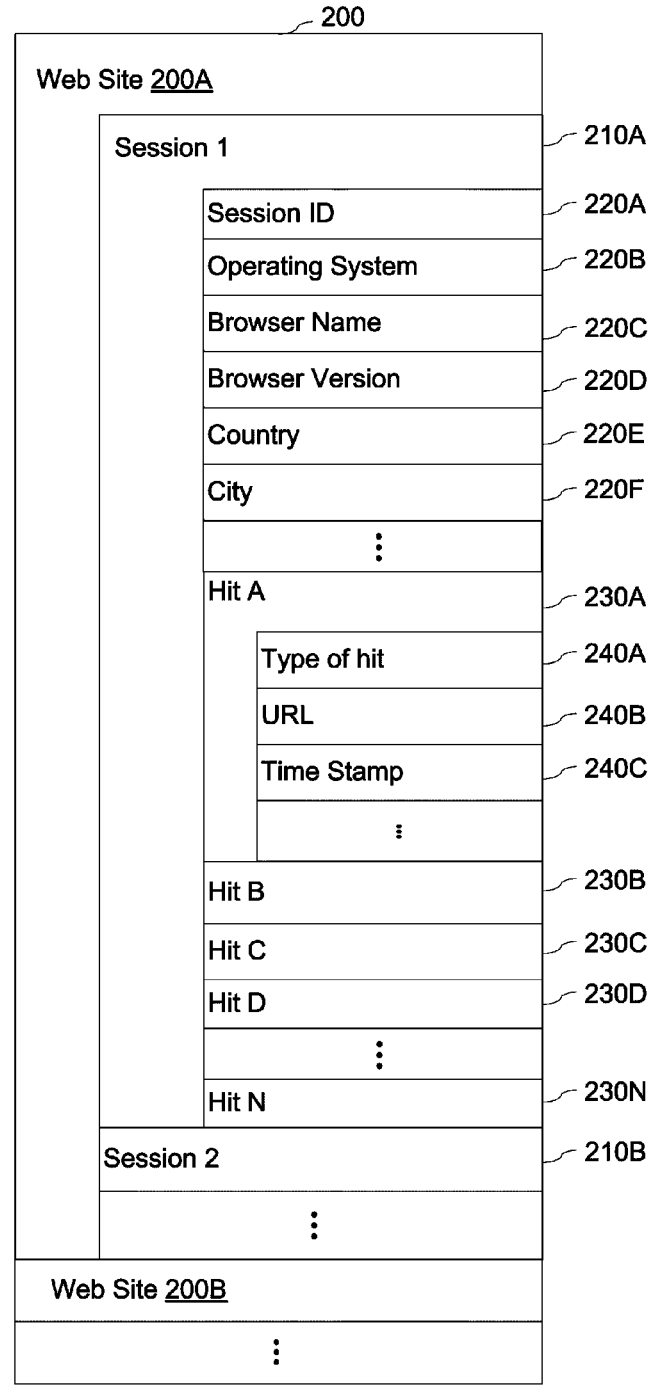
FIG. 2 is a block diagram of a data structure used in the hits database 155 to store sessionized web traffic data at different web sites in accordance with some embodiments

FIG. 2 is a block diagram of a data structure used in the hits database 155 to store sessionized web traffic data at different web sites in accordance with some embodiments. The web traffic data stored in the data structure 200 have a hierarchical structure. The top level of the hierarchy corresponds to different web sites 200A, 200B (i.e., different web servers). For a respective web site, the traffic data is grouped into multiple sessions 210A, 210B, and each session having a unique session ID 220. A session ID uniquely identifies a user's session with the web site 200A for the duration of that user's visit. Within a session 210A, other session-level attributes include the operating system 220B (i.e., the operating system the computer runs on from which the user accesses the web site), the browser name 220C (i.e., the web browser application used by the user for accessing the web site) and the browser version 220D, geographical information of the computer such as the country 220E and the city 220F, etc.

For convenience and custom, the web traffic data within a user session (or a visit) is further divided into one or more hits 230A to 230N. Note that the terms "session" and "visit" are used interchangeably throughout this application. In the context of web traffic, a hit typically corresponds to a request to a web server for a document such as a web page, an image, a JavaScript file, a Cascading Style Sheet (CSS) file, etc. Each hit 230A may be characterized by attributes such as the type of hit 240A (e.g., transaction hit, etc.), the referral URL 240B (i.e., the web page the visitor was on when the hit was generated), the timestamp 240C that indicates when the hit occurs and so on. Note that the session-level and hit-level attributes as shown in FIG. 2 are listed for illustrative purposes only. As will be shown in the examples below, a session or a hit of web traffic data may include many other attributes that either exist in the raw traffic data (e.g., the timestamp) or can be derived from the raw traffic data by the analytics system 150 (e.g., the average pageviews per session).

As noted above in connection with FIG. 1A, the aggregation servers 160 is responsible for aggregating the data records in the hits database 155 at a regular time interval (e.g., per day or per hour) based on their respective session IDs and other dimension or metric attributes. For example, the aggregation servers 160 may determine the total number of visits to a web site during one day by counting the number of sessions associated with the web site for the same day. The aggregation servers 160 may also determine the total number of visits to a web site using a particular type or even version of web browser during one day by counting the number of sessions associated with the web site for the same day that have the specified type or even version of web browser. In some embodiments, the aggregation servers 160 determine values for hundreds or even thousands of predefined attributes based on the hits data records and store the determined values and their associated attributes in a data structure like the one shown in FIG. 3 in accordance with some embodiments.

In some embodiments, the aggregated data stored in the data structure 300 also has a hierarchical structure. The top level of the hierarchy corresponds to different sources 300A, 300B (e.g., different web sites), each source having a unique source ID 310A. For each source, there are at least two types of aggregated data. The aggregated metrics 310B include those attributes and associated values that are determined from the hits data for a predefined period of time without applying any restrictions. For example, if the predefined period of time is one day, the visits attribute 320A may be associated with one or more pairs of (time, value) 330A in which the time represents a specific day such as Oct. 16, 2009 and the value represents the total number of visits (or sessions) during the same day regardless of, e.g., which country or city each visit is from. Similarly, the pageview attribute 320B is also associated with one or more pairs of (time, value) 330B in which the time represents a specific day and the value represents the total number of pageviews during the same day regardless of, e.g., what web browser is used for each pageview.

In some embodiments, a breakdown of a lump sum metric value (e.g., the visits 320A) into multiple values defined by different conditions is desired because it can provide more information to a web analyst about the web traffic. For example, the conditions 310C limit the aggregation of web traffic data for a particular web site to sessions whose country is China. In this case, the aggregation servers 160 generate another set of aggregated metrics 320C by skipping any session whose country is not China. Similarly, the conditions 310D focuses only on the sessions that use Firefox as the web browser. Accordingly, the aggregated metrics 320D should not take into account of any session that uses Internet Explorer. Note that some of the condition-free aggregated metrics 310B may be derived from the conditioned aggregated metrics 320C, 320D. In some embodiments, the aggregate servers 160 typically pre-compute values for many hundreds of aggregated metrics with or without conditions and store those values in the aggregates database 165 for future use.

One use of the aggregates database 165 is to detect events of potential interest in the web analytics data and present them to a web analyst in an intuitive manner. An event of potential interest (also referred to as an alert or an anomaly in this application) is something that might be valuable to the web analyst but is hidden in the vast amount of web traffic data and difficult to identify. For example, after posting an advertisement on a web site, a market analyst is very interested in learning the advertisement's effectiveness in terms of whether there is any traffic increase at the web site during a predefined time period, from what source it sees the largest traffic increase or decrease, and how much of the increased web traffic is related to the advertisement (e.g., as measured by the click-through rate). As another example, a webmaster concerned with the security of a web site is interested in learning about abnormal web traffic patterns as early as possible to prevent serious attacks.

Without the support by the features as described in this application, it may take many hours or even days of effort for a web analyst to "plow" through the massive amount of web analytics data and track down some useful information. This approach not only wastes human resources but also reduces the value of the information due to the time lapse. One aspect of the present application is to develop a system that can automatically detect those events of potential interest from the web analytics data with no or minimal user effort and present the detection result to the web analyst in an efficient and user-friendly manner to help the web analyst's decision making process.

Figure 3:
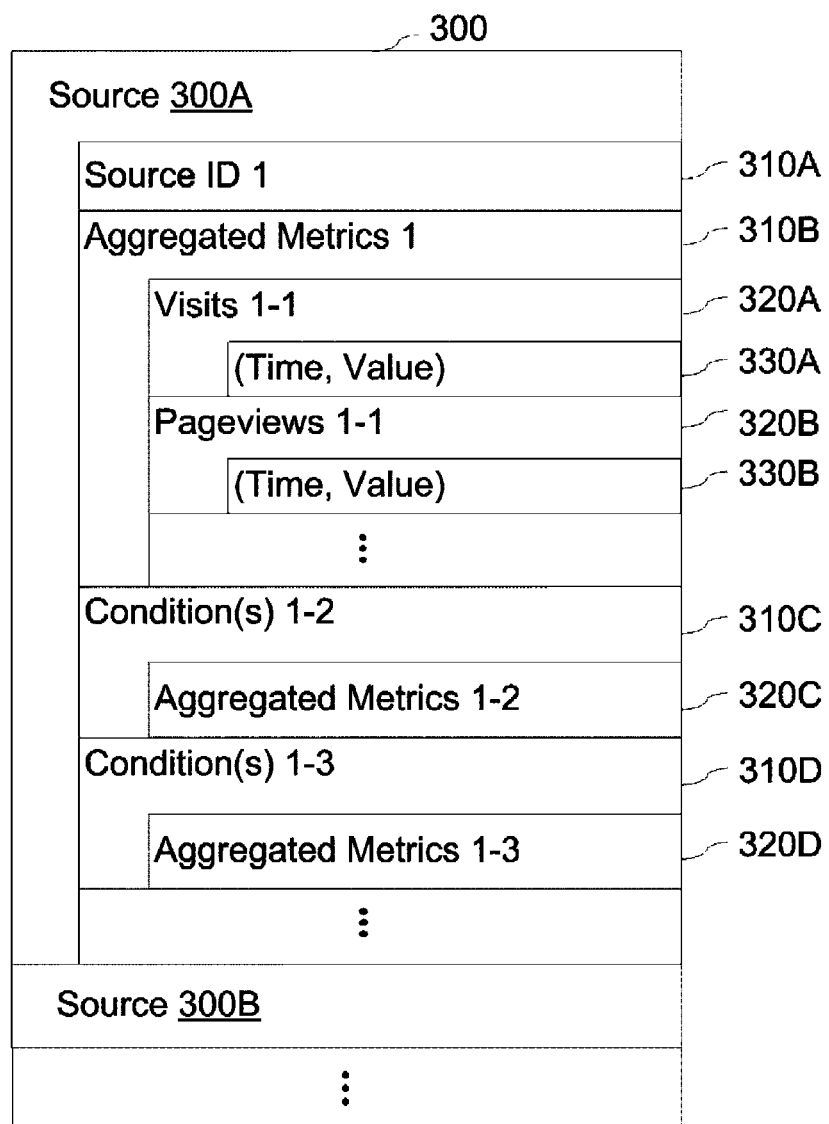
FIG. 3 is a block diagram of a data structure used in the aggregates database 165 to store aggregated web traffic data at different web sites in accordance with some embodiments.

According to some embodiments, the process of identifying any events of potential interest in the web analytics data begins with deriving a number of time series or time sequences from the aggregated web analytics data stored in the data structure shown in FIG. 3 and store the time series in another data structure for further processing. As will be described below, at least two ways of detecting events of potential interest are disclosed in the present application: (i) model-based event detection; and (ii) rule-based event detection.

Generally, the model-based event detection method described herein applies one or more statistical models to a time series to forecast or predict or estimate one or more values for a future time period and then compares the predicted values with the actual value when available. If the differences between the predicted values and the actual value meet a predefined condition, an event of potential interest or an anomaly is identified for the corresponding time period. To some extent, the rule-based approach combines the prediction models and the predefined condition of the model-based approach into a user-specified alert rule. For example, one alert rule may specify that an event of potential interest is detected if the revenue metric attribute of a website at a particular date drops at least 15% than the revenue metric attribute of the same website at the same date of the previous year.

In some embodiments, the model-based or rule-based event detection method can also be performed on a collection of time series data, e.g., in a batch mode, to not only predict anomalies in the future (which is typically the current day, week, or month) but also identify anomalies in the past. In some embodiments, the anomaly prediction for the current time period (e.g., today, this week or month) may only involve the data samples collected in the past and not include any data samples collected during the current time period. In this case, the prediction for the current time period may start right after the time series update with the data samples of the immediately previous time period. In some other embodiments, the anomaly prediction for the current time period uses the data samples from the current time period as well.

Figure 4:
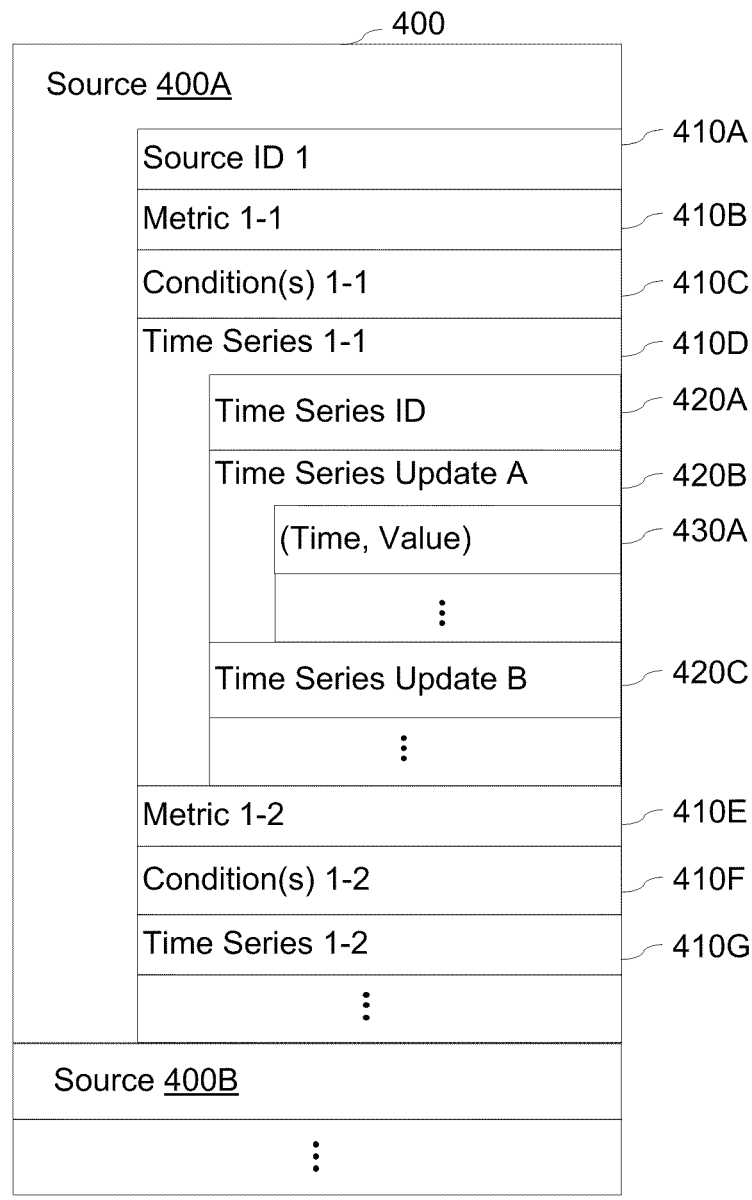
FIG. 4 is a block diagram of a data structure used in the time series database 175 to store time series data extracted from the aggregated web traffic data in accordance with some embodiments.

FIG. 4 is a block diagram of a data structure that stores time series data extracted from the aggregated web traffic data in accordance with some embodiments. In some embodiments, the time series data stored in the data structure 400 has a hierarchical structure. The top level of the hierarchy corresponds to different sources 400A, 400B (e.g., different web sites), each source having a unique source ID 410A. Note that the source ID 410A may be the same as the source ID 310A for the same source. Like the multiple aggregated metrics 310B, 320C, 320D stored in the data structure 300, each source in the data structure 400 may be associated with a plurality of time series, each time series having a unique combination of metric and condition.

For example, the metric 410B is the number of new visits to a website during a day and the condition 410C is that only new visits that come from Paris should be considered. In this case, the time series 410D includes a time series ID 420A and one or more time series updates 420B, 420C and each time series update includes one or more pairs of (time, value) 430A wherein the "time" parameter corresponds to a particular day and the "value" parameter corresponds to a particular number of new visits from Paris during that day. A more detailed example of a time series including multiple updates is provided below in connection with FIG. 6B.

Generally, each source may be characterized by hundreds of metric and dimension attributes in the hits database 155. Different combination schemes of the metric and dimension attributes may produce thousands of possible time series. From a web analyst's perspective, not every possible time series is important enough to justify a spot in the time series database 175. Although a bit arbitrary, each (condition-free or conditioned) time series stored in the time series database 175 is generated because it may carry information of interest to many web analysts. In some embodiments, a web master of a website is allowed to define his or her own new metric or dimension attributes or customize the existing metric or dimension attributes to have a better characterization of the traffic to the website. In this case, the new or customized attributes are additional sources for generating time series data for event detection using the invention disclosed in this application. A more detailed description of how to define new or customize existing attributes can be found in a pending application entitled "Extensible custom variables for tracking user traffic" U.S. Ser. No. 12/907,953 filed Oct. 20, 2009, which is hereby incorporated by reference in its entirety.

In some embodiments, the time series in the data structure 400 are derived from the aggregated data in the data structure 300 of FIG. 3. If a time series corresponds to the aggregated metrics of an entire time source free of any precondition, the condition for this time series in the data structure 400 does not exist or is none. In this case, the time series is also referred to as a "condition-free" time series. If a time series corresponds to the aggregated metrics of the source with one or more conditions, the same conditions used for aggregating the web traffic data are also the conditions in the data structure 400 for the corresponding time series. In this case, the time series is also referred to as a "conditioned" time series. In some embodiments, a source has a number (e.g., 10) of condition-free time series including the metrics like visits, pageviews, bounce rate, pages/visit, new visits, and average time on site, etc. In addition, the source may have more (e.g., 100) conditioned time series, each having a unique set of conditions for filtering out data that does not meet any of the predefined conditions.

In some embodiments, if the definition of a time series does not have any corresponding entry in the aggregates database 165, the time series gathering servers 170 may need to access the hits database 155 to build the time series directly on top of the hits data or even the raw web traffic data from the logfiles 130 or the Javascript code of a client assistance 114 that monitors the user activities at a web page. In some other embodiments, the time series gathering servers 170 can send a request to the aggregation servers 160 for aggregating the hits data according to the time series definition and return the aggregated data to the time series gathering servers 170.

Although the time series database 175 does not include every possible time series that can be derived from a website's hits data, it is a challenge for the time series database 175 to host so many time series related to different sources. In some embodiments, some data quantization and compression techniques may be employed to keep the time series storage relatively small. For example, a value in the time series database 175 is rounded and stored in the form of an expression like $a*2^b$, where the parameter "a" is encoded with a small number (e.g., 5) of bits and the parameter "b" can have more bits such that the difference between the value and the expression is as small as possible. This data quantization scheme is acceptable as long as the loss of precision does not defeat the purpose of detecting those events of potential interest.

For a given time series (e.g., the number of daily visits during a month), each value at a particular date may be a very large number (e.g., three or four digits) but the difference between two consecutive dates may be much smaller (e.g., only two digits). Instead of storing the actual values like $v_1$, $v_2$, $v_3$, etc., one way of saving the storage space in this situation is to calculate the difference between two consecutive values and store the differences like $v_2-v_1$, $v_3-v_2$, etc. in the time series database 175 as long as the base value $v_1$ is available for reconstructing the actual values when needed.

Figure 5:
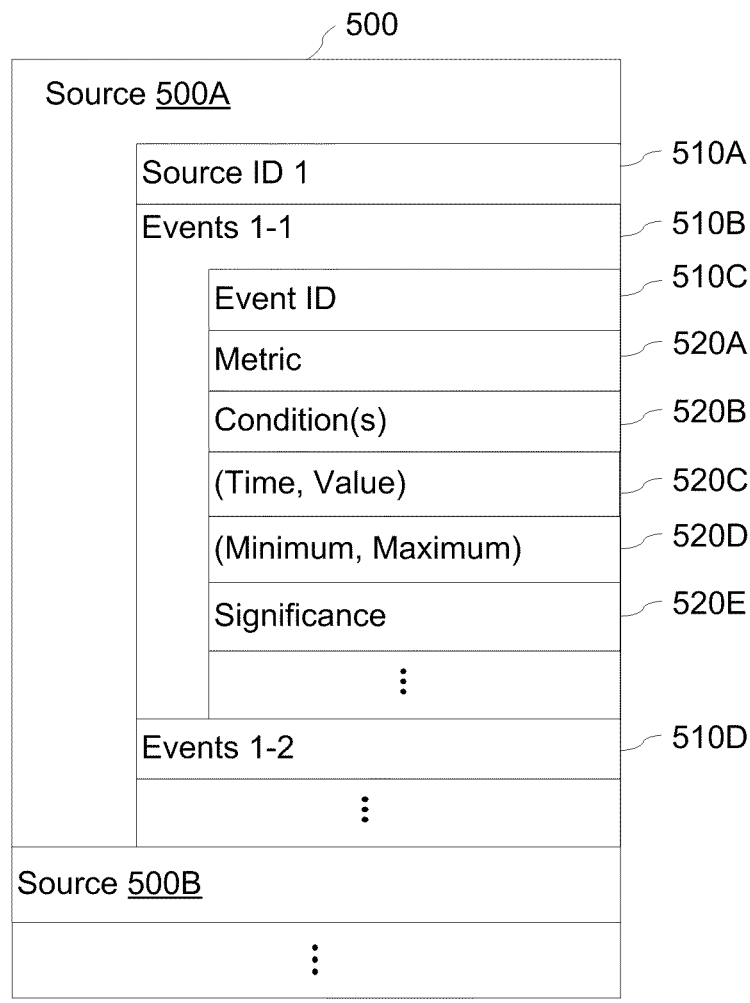
FIG. 5 is a block diagram of a data structure used in the events database 185 to store events of potential interest detected in the time series data in accordance with some embodiments.

FIG. 5 is a block diagram of a data structure that stores events of potential interest detected in the time series data in accordance with some embodiments. The events data stored in the data structure 500 also has a hierarchical structure. The top level of the hierarchy corresponds to different sources 500A, 500B (e.g., different web sites), each source having a unique source ID 510A. Note that the source ID 510A may be the same as the source ID 310A in the aggregates database 165 and the source ID 410A in the time series database 175 for the same source. Each event 510B is associated with an event ID 510C, a metric 520A, one or more conditions 520B, a pair of (time, value) 520C wherein the value is the actual value for that time period, a pair of (minimum, maximum) 520D wherein the minimum and maximum values are usually determined through one or more statistical models, a significance factor 520E that indicates the interest level of this event to a web analyst, etc. A more detailed description of the (minimum, maximum) pair and the significance factor is provided below in connection with FIGS. 7A and 7B.

Having described the data structures of the time series database 175 and the events database 185, we now discuss the process performed by the time series gathering servers 170 for updating the time series database 175 and the process performed by the event detection servers 180 for updating the events database 185. For convenience, it is assumed that the initial setup of the analytics system 140 is completed and different components within the system 140 are in a normal operation mode.

Figure 6A:
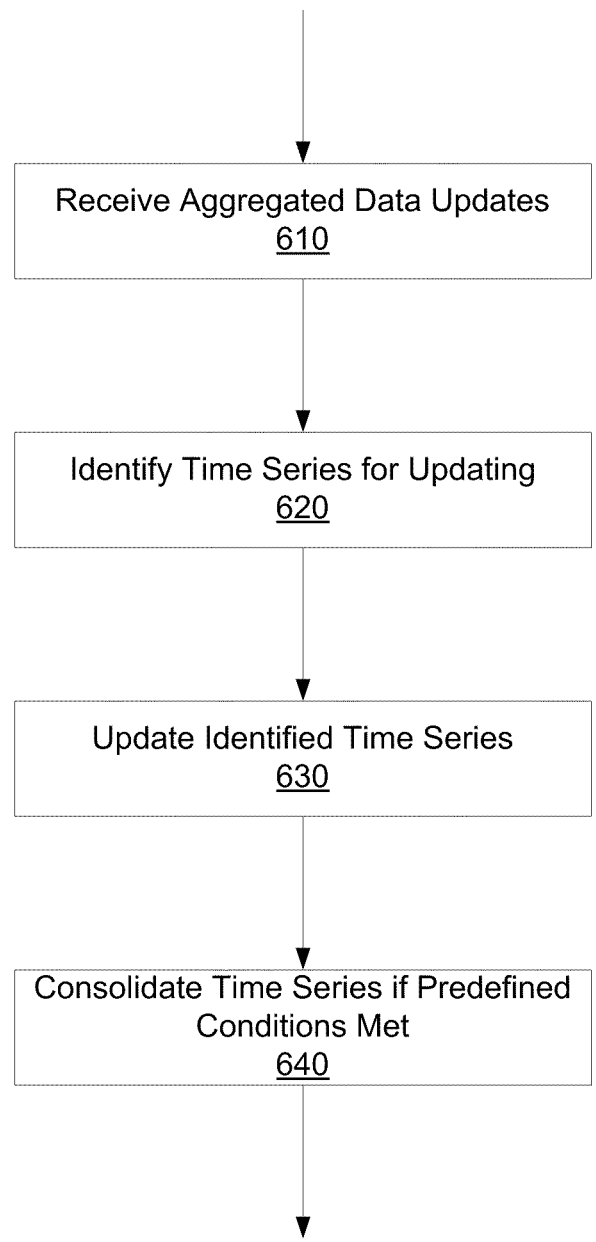
FIG. 6A is a flow chart of a process for updating the time series data using the aggregated data updates in accordance with some embodiments.

FIG. 6A is a flow chart of a process for updating the time series data using the aggregated data updates in accordance with some embodiments.

At a regular time interval (e.g., every few hours or every night), the time series gathering servers 170 receive one or more aggregated data updates (610). In some embodiments, an aggregated data update provides information about the user activities at one or more websites during the recent predefined time interval. For example, the update may include a number of visits to a particular website or any other aggregated metrics that have been collected in the time series database 175. It should be noted that, as explained earlier, the invention of this application is not limited to web traffic data. In fact, it can be used to identify or predict anomalies in almost any type of time series data. In some embodiments, the updates are pulled out of the aggregates database 165 by the time series gathering server 170. In some other embodiments, the aggregation servers 160 push the updates to the time series gathering servers 170 for further processing.

For each update, the time series gathering servers 170 identify the time series in the database 175 for updating (620). As noted above, the time series data in the time series database 175 are organized under different sources as different sets of metrics and conditions. At a predefined time (e.g., every night), the time series gathering servers 170 collect the aggregated data updates corresponding to different time series and then apply each of them to a corresponding time series in the database 175. In some embodiments, the metric and dimension attributes associated with different updates are part of the key for identifying the corresponding time series in the database 175. In some embodiments, the data structure of the aggregated data updates is similar to the data structure 300 in FIG. 3. For each source ID in the update, the time series gathering servers 170 find the corresponding entry in the data structure 400 in FIG. 4 that has the same source ID. Next, the time series gathering servers 170 update the identified time series using the data entries in the update (630) and consolidates the time series updates if predefined conditions are met (640).

Figure 6B:
FIG. 6B is a block diagram of an exemplary process for updating a time series on a weekly basis in accordance with some embodiments.

FIG. 6B is a block diagram of an exemplary process for updating a time series on a weekly basis in accordance with some embodiments. In this example, it is assumed that the updates to the time series database 175 happen on a daily basis and a time series consolidation process occurs every week.

Figure 11A:
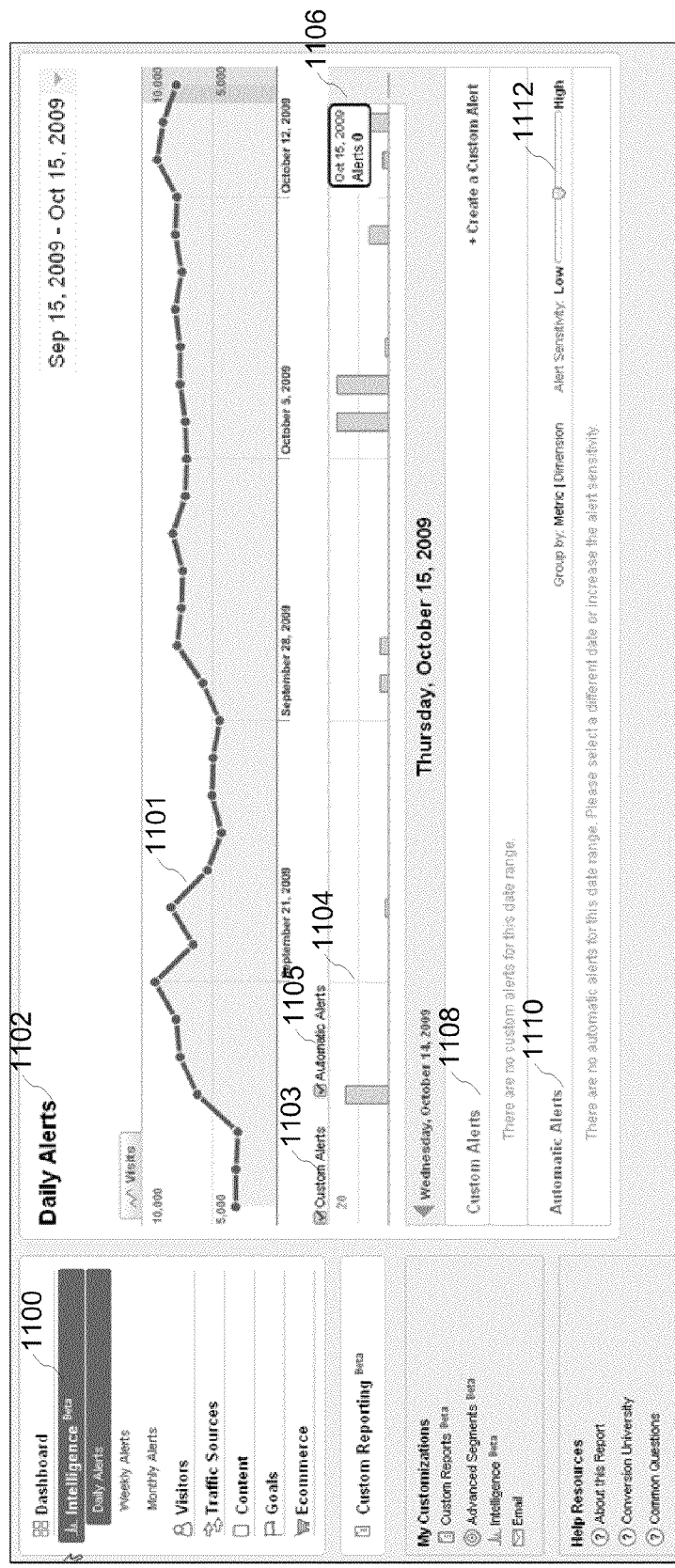
FIGS. 11A to 11C are screenshots of graphical user interfaces that display daily, weekly, and monthly events of potential interest, respectively, in accordance with some embodiments.
Figure 11B:
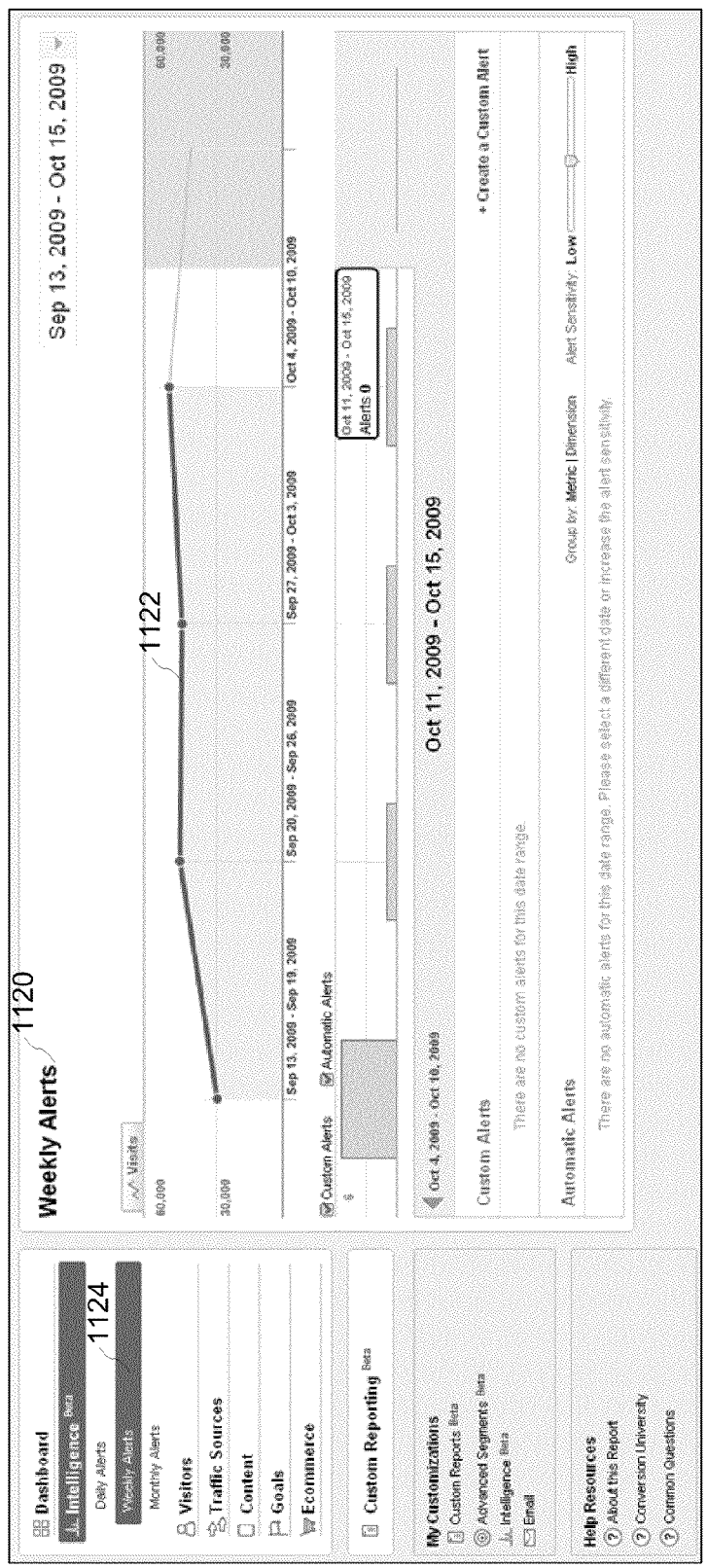
Figure 11C:
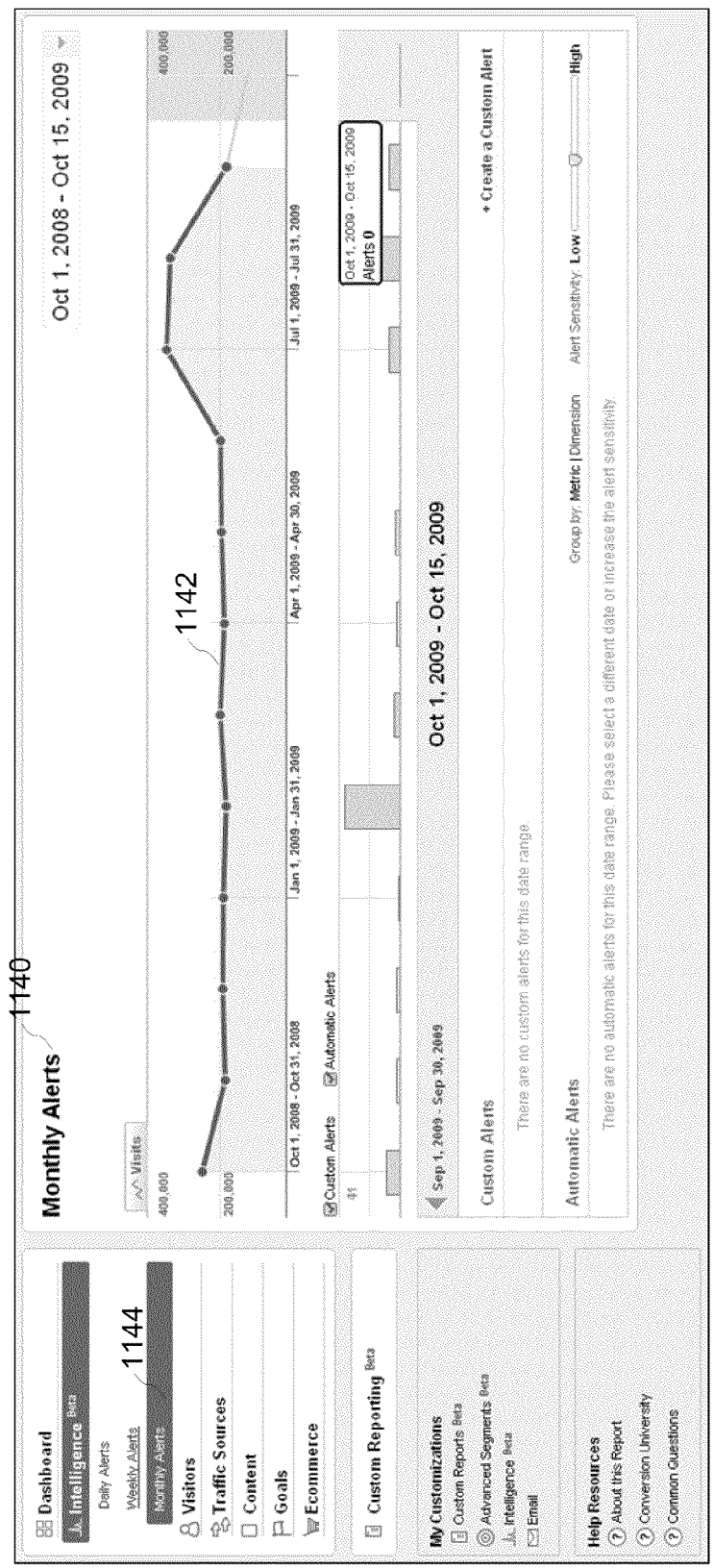

On Sunday, the time series 650 includes only one time series update 650-0. The time series update 650-0 includes a plurality of (time, value) pairs, one pair per day and each value corresponding to an actual value for that day. In some embodiments, the oldest entry of these (time, value) pairs may be dated a long time (e.g., two years) back and the newest entry $(T_N, V_N)$ is generated this Sunday. As will be explained below in detail, each time series is used for predicting one or more values at a future time under different prediction models. In some embodiments, the daily time series are summed on a weekly basis to form a weekly time series, which may be further summed on a monthly basis to a monthly time series. Note that this summation operation is similar to a low-pass filter of the data samples. As a result, both the weekly time series and the monthly time series are typically smoother than the corresponding daily time series during the same time period. As shown in FIGS. 11A to 11C, this could result that an anomaly identified in the daily time series does not have an anomaly in the corresponding week of the weekly time series or the corresponding month of the monthly time series.

On Monday, the time series gathering servers 170 receive a time series update 650-1. In some embodiments, this update is stored as a separate time series update entry 420C in the data structure 400 without being combined with the time series update 650-0. By doing so, it is convenient for the servers 170 to add and access new entries into the data structure 400. This process repeats every day and a new time series update 650-2 to 650-6 are added to the time series 650 until the next Sunday.

Upon receiving a new update entry $(T_{N+7}, V_{N+7})$ on the next Sunday, the time series gathering servers 170 determine that it is time to consolidate the time series updates accumulated during the past week. In some embodiments, the time series gathering servers 170 follows the first-in-first-out (FIFO) rule by eliminating the oldest seven (time, value) pairs ranging from $(T_0, V_0)$ to $(T_6, V_6)$ from the time series 650 and combining the newest seven (time, value) pairs ranging from $(T_{N+1}, V_{N-1})$ to $(T_{N+7}, V_{N+7})$ with the time series 650 to form a new time series 655 that includes only one time series update 655-0. By repeating this process on a regular basis, the time series gathering servers 170 maintain a sliding time window on a fixed length of time series data when determining the existence of any events of potential interest. It should be noted that the method of updating time series as described above in connection with FIG. 6B is for illustrative purposes. There are many other ways of managing the time series that are known in the art.

In some embodiments, an event of potential interest has a practical, meaningful value only if the corresponding web site has received a sufficient number of visits from a broad scope of visitors for a certain time period. For example, if a website only receives a handful (e.g., less than 10) of visits per day, a small, insignificant variation of user activities (e.g., an increase of daily visits from 10 to 30) could result in a false-alarm-like event of potential interest being detected by the event detection servers 180. Too many false-alarm-like events of potential interest would likely make the actual events of interest less visible to the web analyst. To solve this problem, the time series gathering servers 170 may set a threshold such that no time series is generated for a website until the website's associated web analytics data reaches the threshold. For example, the threshold can be that a website receives at least 100 visits per day or 50 visits from distinct IP addresses. This lower-bound on the generation of time series reduces not only the statistical noise level of the detected events of potential interest but also the storage needed for storing the time series.

For a given set of times series associated with a particular source, the event detection servers 180 are responsible for identifying events of potential interest therein and populating the identified events in the events database 185. As noted above, there are at least (i) model-based and (ii) rule-based two different ways of detecting events, which will be described in more detail below.

Figure 7A:
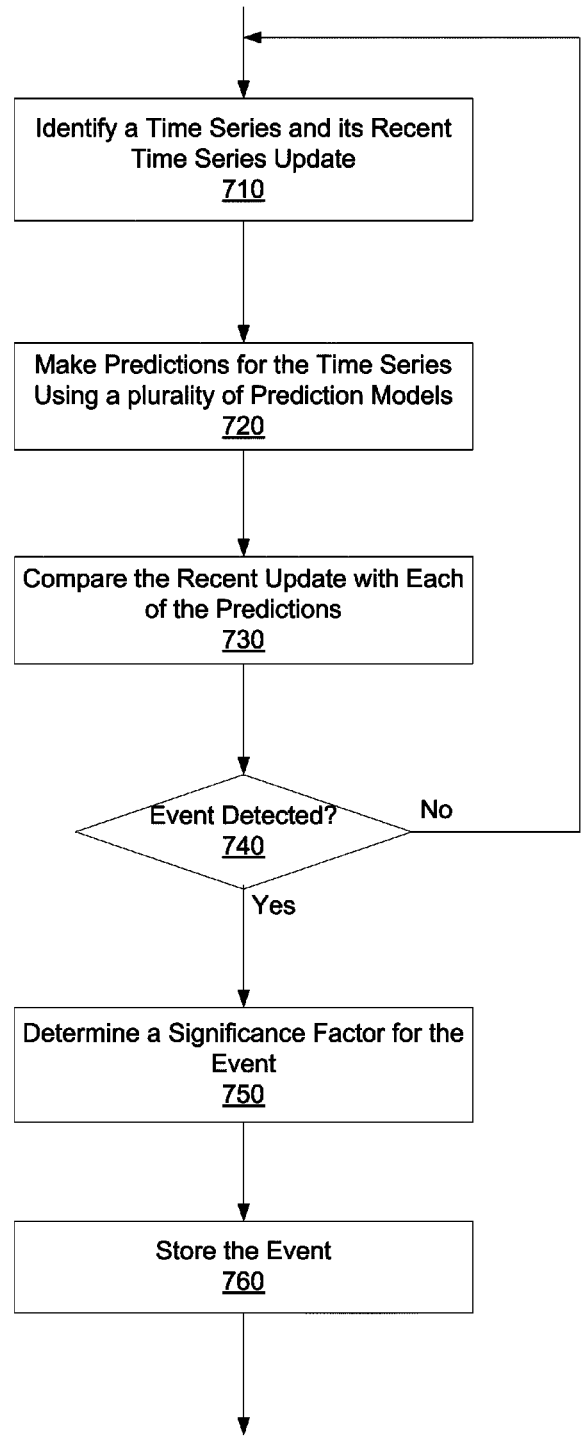
FIGS. 7A and 7B are flow charts of a model-based process for detecting events of potential interest in a time series in accordance with some embodiments.
Figure 7B:
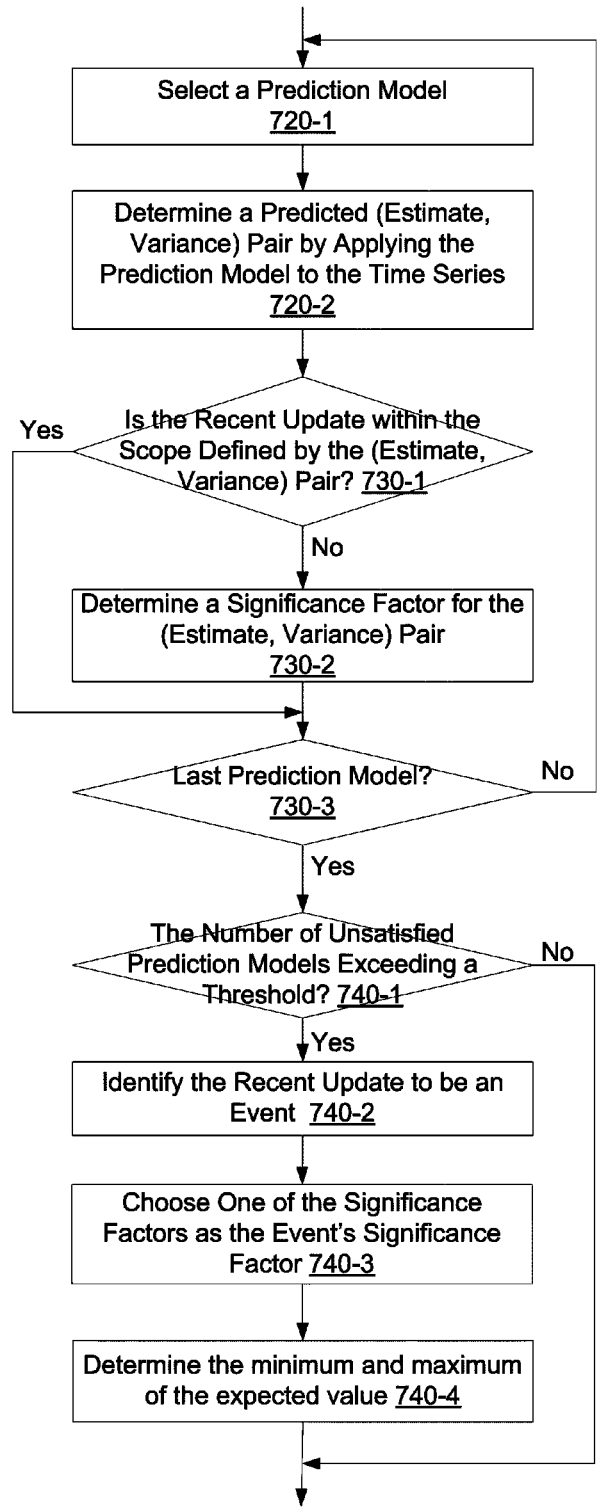

FIGS. 7A and 7B are flow charts of a model-based process for detecting events of potential interest in a time series in accordance with some embodiments. In some embodiments, this process occurs periodically (e.g., every night). In some other embodiments, this process is performed in response to a user request from a client 110. For simplicity, it is assumed in the example below that the event detection servers 180 work on the time series at a predefined time. After identifying and extracting a time series and its recent update from the time series database 175 (710), the event detection servers 180 make predictions for the time series using a plurality of prediction models.

For example, assume that the event detection servers 180 have a time series of the last N days of numbers of visits to a website and the number of visits for the current day. Whether the number of visits for the current day is high or low enough to be qualified as an event of potential interest, the event detection servers 180 need to determine the trend of the number of visits at the website and use the trend to estimate a predicted number of visits for the current day using the time series of the last N days of numbers of visits (note that the value of N may vary for different forecasting models). Although many statistical models can be used to making the prediction. Two types of modeling techniques are described herein for illustration: (i) linear regression; and (ii) Holt-Winters exponential smoothing.

Generally, linear regression is an approach of modeling a linear relationship between a dependent variable y and one or more independent variables $x_1, x_2, \ldots, x_n$, such that the linear model's unknown parameters can be estimated from the observed data. Assuming that the relationship between the number of visits $(v_i)$ and the corresponding date $(t_i)$ is linear, this relationship can be mathematically expressed as follows:

$$v = \alpha t_{i} + \beta,$$

where $t_i = 1, 2, \ldots, N$ or (in the form of matrix)

$$\begin{bmatrix} v_1 \\ v_2 \\ \ldots \\ v_N \end{bmatrix} = \begin{bmatrix} t_1 & 1 \\ t_2 & 1 \\ \ldots & 1 \\ t_N & 1 \end{bmatrix} \begin{bmatrix} \alpha \\ \beta \end{bmatrix}$$

A numerical solution to the matrix of linear equations (e.g., using the well-known least-squares algorithm) can determine the two parameters $\alpha$ and $\beta$. Using the estimated $\hat{\alpha}$ and $\hat{\beta}$, it is possible to predict the number of visits $(v_j)$ at any given date in the future $(t_j)$ as follows:

$$v_j = \hat{\alpha} t_j + \hat{\beta}.$$

From the time series of the actual numbers of visits at different dates, it is also possible to determine a variance for the predicted number of visits at the given date using well-known statistics theory. As a result, an estimated range of the number of visits at a given date using linear regression can be expressed as follows:

$$[v_j - s_j, v_j + s_j]$$

where $s_j$ represents the variance of the prediction using linear regression.

Unlike the linear regression that gives the past observations equal weight, exponential regression is an approach that assigns exponentially decreasing weights to the past observations as they get older. Assuming that the sequence of observations begins at time $t=0$, one form of exponential smoothing (i.e., single exponential smoothing) is given by the following formulas:

$$w_0 = v_0,$$

$$w_i = \lambda v_i + (1-\lambda) w_{i-1}$$

The parameter $\lambda$ helps to define the amount of weight given to a past observation. Generally, the weight given to the observation at the $k_{th}$ day in the past from the current date is expressed as:

$$\lambda (1-\lambda)^{k-1}$$

In some embodiments, another form of exponential smoothing (i.e., double exponential smoothing) is used for making the forecasting to capture a trend in the time series, if there is any. Double exponential smoothing is given by the following formulas:

$$w_0 = v_0,$$

$$b_0 = v_1 - v_0,$$

$$w_i = \alpha v_i + (1-\alpha)(w_{i-1} + b_{i-1}),$$

$$b_i = \gamma (w_i - w_{i-1}) + (1-\gamma) b_{i-1}$$

where $0 \leq \gamma \leq \alpha \leq 1$.

In some embodiments, the parameter $\gamma$ is set to be no greater than the parameter $\alpha$. In some embodiments, other non-linear statistical modeling schemes such as the triple exponential smoothing may be used to take care of the seasonality (also known as periodicity) in the time series data, which feature is typically prominent when a long time series is used for forecasting and the time series itself demonstrates some cyclic patterns. For example, some websites such as a weather forecasting website usually receive more traffic every Friday of each week because many visitors are interested in learning the weather condition during the weekend. In this case, the number of visits to the website may show a fluctuating pattern on a weekly basis and the triply exponential smoothing may be more appropriate for capturing the trend accurately.

In either modeling technique, the number of past observations or actual data samples used for predicting the future value affects the predicted value's sensitivity to the recent changes of the actual data samples. In some embodiments, three time-window lengths, i.e., 4 days, 21 days, and 56 days, are chosen as the numbers of past observations used for making separate predictions so as to capture both the recent changes of the actual samples and the long-term trends using different predictions if the predicted values are daily-based or weekly-based. If the predicted values are monthly-based, the three time-window lengths are respectively, 0.5 month, 3 months, and 8 months according to some embodiments. Note that the length of a time window used for predicting a value at a future time, to some extent, determines whether the predicted value is more or less likely to be affected by a recent fluctuation in the time series. A prediction model that uses a longer time window considers more data samples into the past for forecasting a value in the future. This effect is similar to a low-pass filter such that the predicted outcome is less sensitive to the recent fluctuation in the time series and it is more likely to capture the trend in the time series. By contrast, a prediction model based on a short time window uses fewer data samples to make the prediction and the predicted result is usually more sensitive to the recent fluctuation in the time series. A combination of the predicted values based on the different lengths of time series may result in a more reliable prediction that takes into account both the long-term and short-term features in the time series.

In some embodiments, the event detection servers 180 make nine predictions using the two modeling techniques and the three different lengths of time windows. For convenience, the nine predictions are expressed as:

$$[M_i, e_i]$$

where i=1, 2, 3, 4, 5, 6, 7, 8, 9;
$M_i$ represents the $i_{th}$ predicted metric value at the current date; and
$e_i$ represents the variance of the $i_{th}$ prediction at the current date.

In particular, three out of the nine forecasted models are derived from linear regression and the other six models are from double exponential smoothing because three possible values $\{x_1, x_2, x_3\}$, which are ranked in a monotonically increasing order, are candidates for each of the two parameters $\alpha$ and $\gamma$. As noted above, $\gamma$ is set to be no greater than $\alpha$. Therefore, the three possible values $\{x_1, x_2, x_3\}$ produce six different combinations that correspond to the six models as follows:

$$[\alpha=x_1, \gamma=x_1],$$

$$[\alpha=x_2, \gamma=x_1],$$

$$[\alpha=x_3, \gamma=x_1],$$

$$[\alpha=x_2, \gamma=x_2],$$

$$[\alpha=x_3, \gamma=x_2],$$

$$[\alpha=x_3, \gamma=x_3].$$

With the multiple predictions in hand, the event detection servers 180 compare the actual value of the current date with each of the six predictions (720). Based on the comparison result, the event detection servers 180 determine whether an event of potential interest is detected or not (740). For each determined event, the event detection servers 180 also give it a significance factor that indicates how unlikely the event is (750) and stores the event in the events database 185 (760). In general, the more unlikely the event is, the more interested the web analyst may be. For example, if there is an event indicating a significant jump in the number of visits at a particular day when compared with the trend in the past, the web analyst would probably like to investigate the cause behind this jump and find out, e.g., whether it relates to a potential hacker's attack or a successful commercial promotion that immediately preceded the event. Note that not every event identified by the analytics system 140 may deserve an increased level of user attention. But by displaying a number of events or anomalies for each day or week or month, the analytics system 140 presents to a user such as a web analyst a highly-reliable "roadmap," with which the web analyst can quickly "plow" through a large amount of web traffic data and derive information valuable for improving the quality of service offered by the website.

Assume that:
the time series being analyzed is the total number of daily visits to a website during a particular date;
the six predictions are [344, 15], [500, 154], [402, 23], [389, 73], [588, 112], and [693, 87]; and
the actual number of visits is 618.

As shown in FIG. 7B, the event detection servers 180 select the first predicted model (720-1) and determines that the estimate and variance are [344, 15] (720-2). A comparison of the actual number 618 with the predicted model indicates that the actual number is not within the scope defined by the model (730-1, no). In this case, the event detection servers 180 further determine a significance factor for the first model. In some embodiments, the significance factor is determined by calculating the extent of stretching the variance of the model to include the actual number within the stretched scope of the first model. For example, the significance factor for the first model can be (618−344)/15=18.3.

Since there are still five models left for comparison (730-3, no), the event detection servers 180 then return to select the second model, [500, 154]. This time, the comparison indicates that the actual number 618 is within the scope of the second model (730-1, yes) and the event detection servers 180 then go ahead working the next model under the last model is processed (730-3, yes). In this example, three out of the six models, i.e., [500, 154], [588, 112], and [693, 87] are satisfied by the actual number 618 and three other models, i.e., [344, 15], [402, 23], and [389, 73] are not satisfied by the actual number 618. Assuming that the threshold for detecting an event is that at least half of the models are not satisfied (740-1), the event detection servers 180 then determine that the actual number of visits 618 is an event of potential interest (740-2) and chooses a significance factor for the event (740-3).

In some embodiments, the significance factor of an event is the significance factor of one of the unsatisfied prediction models such that (i) the actual number is more likely to satisfy this prediction model than any other unsatisfied prediction models and (ii) the actual number would satisfy more than half of all the prediction models by satisfying this prediction model and therefore no longer qualify as an event. In the example above, the significance factor of the prediction model [389, 73], i.e., (618−389)/73=3.1, is chosen to be the event's significance factor. As will be explained below in connection with FIG. 8B, this significance factor is used for determining whether the event should be displayed to a user or not.

In some embodiments, the event detection servers 180 also use the models to predict the minimum and maximum of the expected value for that particular time period (740-4). This value gives a user a range of a normal value for that time period had there been no anomalous user activities. In some embodiments, the predicted metric values according to different models are ordered by their magnitudes. For example, 10 models result in a sequence of 10 predicted values. Among the 10 predicted values, the second to the lowest value is chosen to be the minimum of the expected value and the second to the highest value is chosen to be the maximum of the expected value if the actual value is outside the range defined by the pair of (minimum, maximum). Otherwise, no minimum or maximum values are available for the corresponding event.

Compared with the model-based event detection that requires little user interaction, the rule-based event detection described below provides an end user with more control on what kind of user activities may be potentially "interesting" or valuable. Since these two approaches are often complimentary to each other, they may provide better outcomes if used in combination.

Figure 7C:
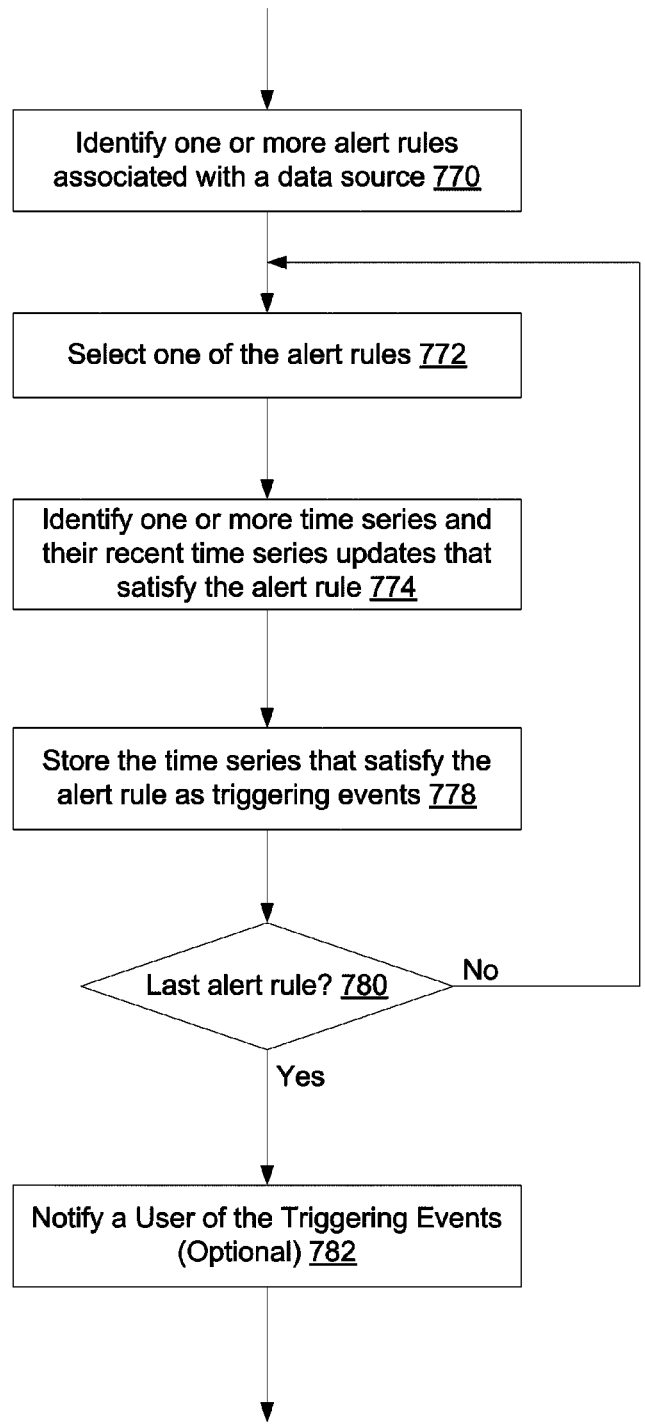
FIG. 7C is a flow chart of a rule-based process for detecting events of potential interest in a time series in accordance with some embodiments.

FIG. 7C is a flow chart of a rule-based process for detecting events of potential interest in a time series in accordance with some embodiments.

For a data source (e.g., a web site), the event detection servers 180 identify one or more alert rules (770) in the alert rules database 195. In some embodiments, the event detection servers 180 query the alert rules database 195 for any alert rules that may be applicable to the time series associated with the data source. The alert rules database 195 stores a plurality of user-specified event triggering conditions that different users enter through a graphical user interface at a client 110, an example of which is described below in connection with FIG. 12E. In some embodiments, the alert rules may be stored in the same database as the dataset segment schemes supported by the analytics system 140.

The event detection servers 180 select one of the identified alert rules (772) and apply the alert rule to the time series database 175 to identify those time series, if any, that satisfy the alert rule (774) and store them in the events database 195 as trigging events (778). For example, if the time series is a sequence of numbers of visits from visitors in China, the application of an alert rule that triggers an event if the visits from China increase by 10% would be appropriate (although the time series may fail to trigger such event if the recent time series update does not show at least 10% increase of visits). In contrast, another alert rule that triggers an event if the visits from Brazil drop 5% would not be applicable.

The event detector servers 180 repeat the aforementioned process until the last alert rule associated with the data source has been processed (780, yes). In some embodiments, these triggering events will be shown to a user through a graphical user interface per the user's request. In some other embodiments, the analytics system 140 also notifies the user of the triggering event through other communication channels such as email, text messaging, voicemail, etc.

The aforementioned description focuses primarily on how the analytics system 140 detects events of potential interest in the collected web analytics data through data aggregation and time series data analysis. The following description shifts its focus on how the events of potential interest are served to the users of the analytics system 140 in a client-server environment like the one shown in FIG. 1B.

Figure 8A:
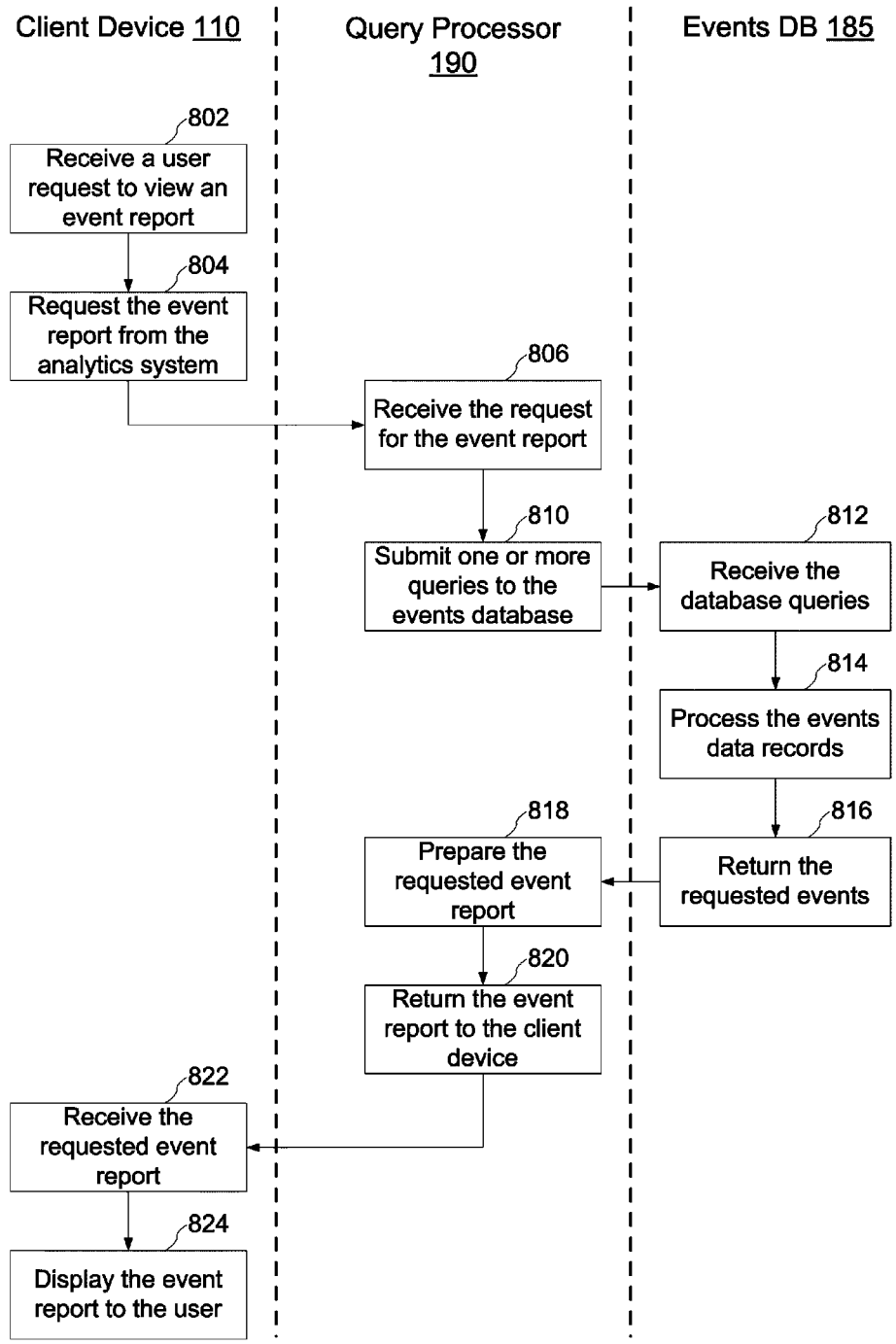
FIGS. 8A and 8B are flow charts illustrating how the analytics system prepares and serves a report of events of interest in response to a user request in accordance with some embodiments.
Figure 8B:
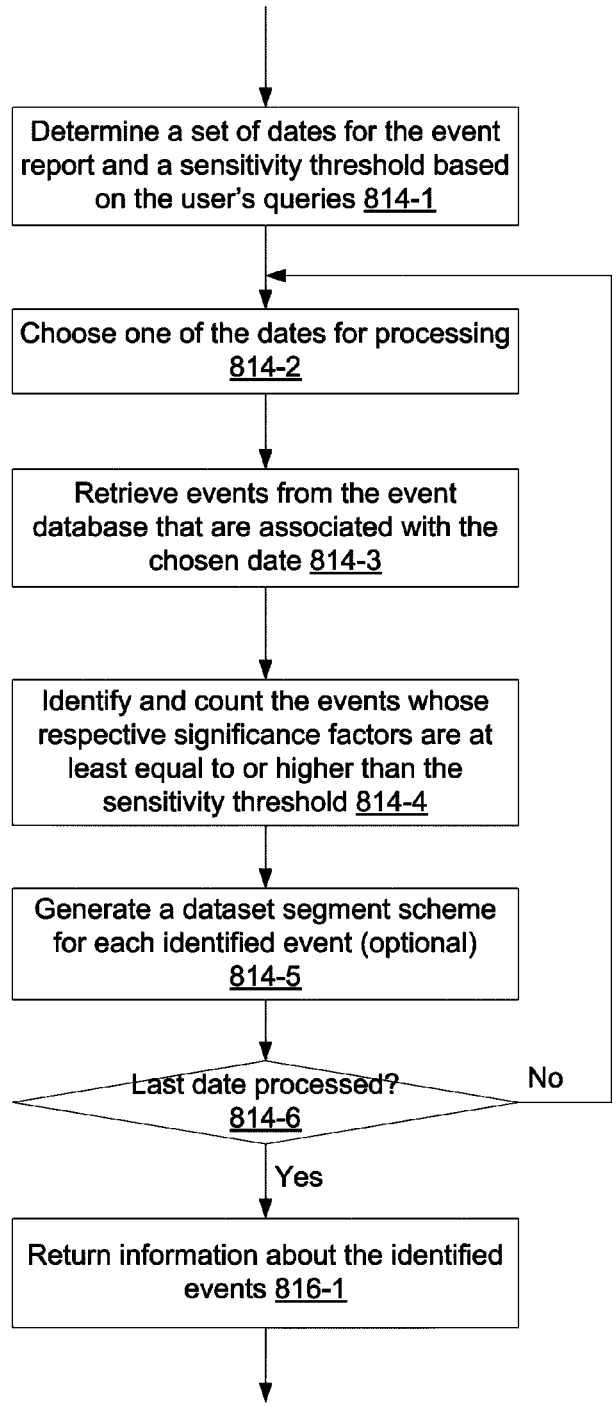

FIGS. 8A and 8B are flow charts illustrating how the analytics system prepares and serves a report of events of interest in response to a user request in accordance with some embodiments.

At a client 110, a user submits a request for viewing an event report for a particular web site. Upon receipt of the user request (802), the client 110 generates a request for the event report to the analytics system 140 (804). In some embodiments, the client request is an HTTP request. Upon receiving the client request (806), the query processor 190 in the analytics system 140 transforms the client request into one or more queries to the events database 185 and submits them to the database (810). For each of the database queries received from the query processor 190 (812), the events database 185 identifies the corresponding events data records (if any) (814) and returns them to the query processor 190 for preparing a response to the client request (816).

As shown in FIG. 8B, the request from the client 110 includes a range of dates and a sensitivity level for querying the events database (814-1). After determining the dates and the sensitivity threshold (814-1), the events database 185 chooses one of the dates for further processing (814-2). The further processing includes retrieving events associated with the chosen date (814-3); identifying and counting the events whose respective significance factors are at least equal to or higher than the user-specified sensitivity threshold (814-4); and generating a dataset segment scheme for event identified event (814-5). After looping through all the dates (814-6, yes), the events database 185 returns the information about the identified events to the query processor 190.

Back to the side of the query processor 190, it compiles an event report using the events information returned from the events database 185 (818) and then returns the report to the client 110 (820). Upon receiving the event report (822), the client 110 displays the report to the user (824). Exemplary screenshots of the graphical user interface for displaying the event reports are described below in connection with FIGS. 11A to 11C.

Figure 9:
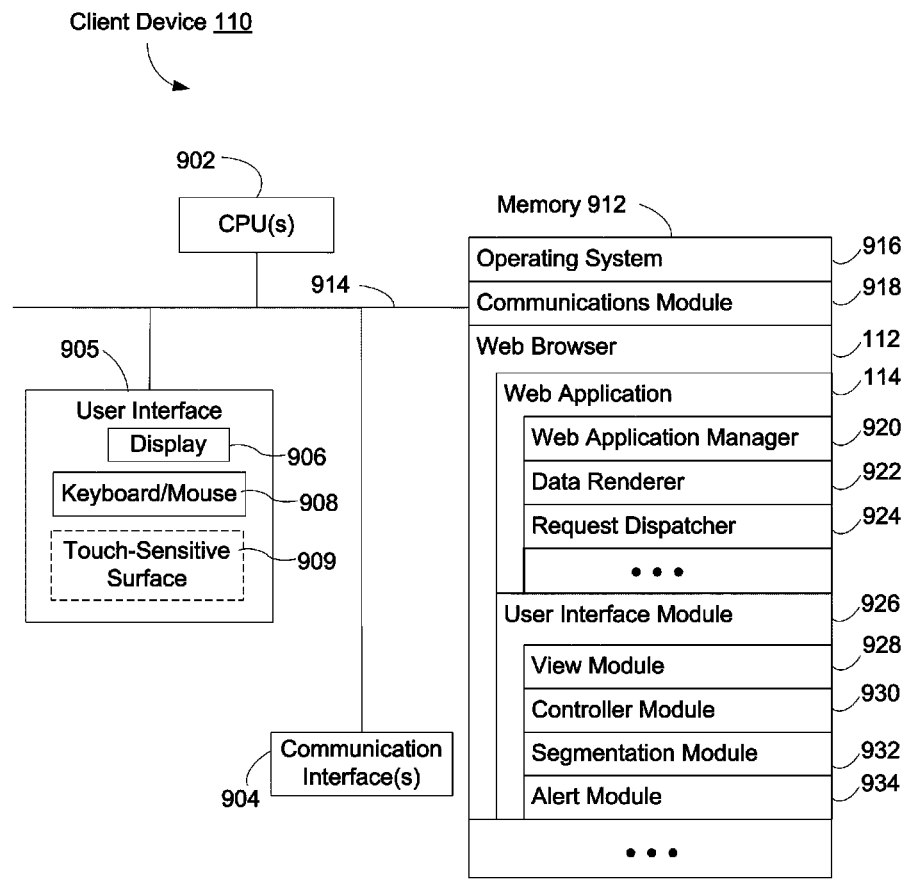
FIG. 9 is a block diagram of a client device for requesting and rendering web analytics reports in accordance with some embodiments.

FIG. 9 is a block diagram of a client device used by, e.g., a web analyst, for requesting and rendering web analytics reports in accordance with some embodiments. The client 110 generally includes one or more processing units (CPU's) 902, one or more network or other communications interfaces 904, memory 912, and one or more communication buses 914 for interconnecting these components. The communication buses 914 may include circuitry (sometimes called a chipset) that interconnects and controls communications between components. The client 110 may optionally include a user interface 905, for instance, a display 906, a keyboard and/or mouse 908, and a touch-sensitive surface 909. Memory 912 may include high speed random access memory, such as DRAM, SRAM, DDR RAM or other random access solid state memory devices; and may also include non-volatile memory, such as one or more magnetic disk storage devices, optical disk storage devices, flash memory devices, or other non-volatile solid state storage devices. Memory 912 may include mass storage that is remotely located from the central processing unit(s) 902. Memory 912, or alternately the non-volatile memory device(s) within memory 912, comprises a non-transitory computer readable storage medium. Memory 912 or the computer readable storage medium of memory 912 stores the following elements, or a subset of these elements, and may also include additional elements:

an operating system 916 that includes procedures for handling various basic system services and for performing hardware dependent tasks;

a network communication module 918 that is used for connecting the client 110 to other servers or computers including the analytics system 140 via one or more communication network interfaces 904 (wired or wireless), such as the Internet, other wide area networks, local area networks, and metropolitan area networks and so on;

a client application 112 (e.g., a web browser), including one or more client assistants 114 (e.g., toolbar, browser plug-in) for monitoring the activities of a user; in some embodiments, the client assistant 114, or a portion thereof, may include a web application manager 520 for managing the user interactions with the web browser, a data renderer 922 for supporting the visualization of an analytics report, and a request dispatcher 924 for submitting user requests for new analytics reports; and a user interface module 926, including a view module 928 and a controller module 930, for detecting user instructions to control the visualization of the analytics reports. In some embodiments, the user interface module 926 further includes a segmentation module 932 for displaying a segmentation/filter definition template and receiving user instructions for building a dataset segment scheme using the template and an alert module 934 for displaying an alert definition template and receiving user instructions for building an alert rule using the template (see, e.g., descriptions below in connection with FIGS. 12D and 12E).

Figure 10:
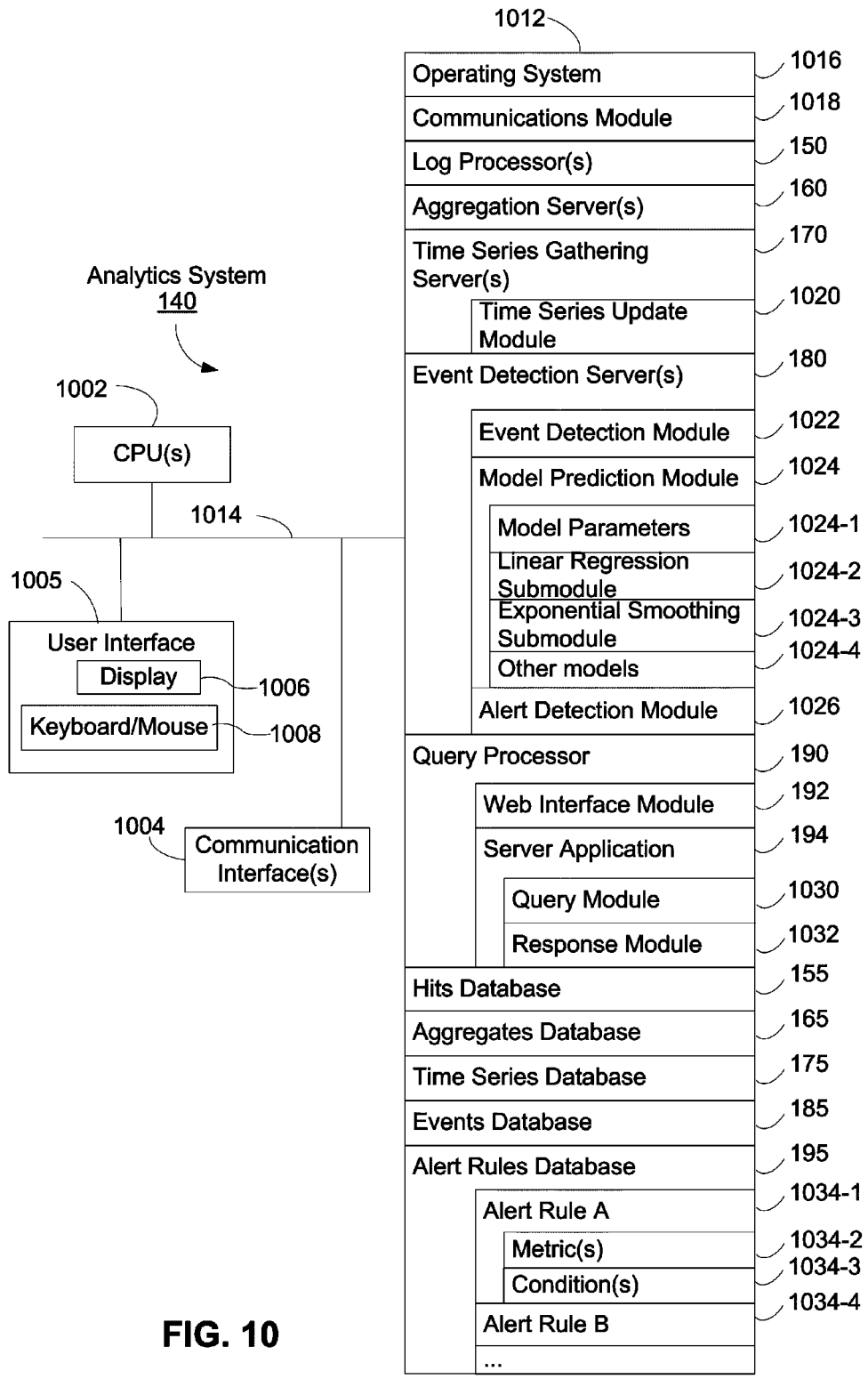
FIG. 10 is a block diagram of an analytics system for processing web traffic data, identifying events of potential interest therein, and serving web analytics reports in response to user requests in accordance with some embodiments.

FIG. 10 is a block diagram of an analytics system for processing web traffic data, identifying events of potential interest therein, and serving web analytics reports in response to user requests in accordance with some embodiments. The analytics system 140 generally includes one or more processing units (CPU's) 1002, one or more network or other communications interfaces 1004, memory 1012, and one or more communication buses 1014 for interconnecting these components. The analytics system 140 may optionally include a user interface 1005 comprising a display device 1006 and a keyboard 1008. Memory 1012 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 1012 may optionally include one or more storage devices remotely located from the CPU(s) 1002. Memory 1012, or alternately the non-volatile memory device(s) within memory 1012, comprises a non-transitory computer readable storage medium. Memory 1012 or the computer readable storage medium of memory 1012 stores the following elements, or a subset of these elements, and may also include additional elements:

an operating system 1016 that includes procedures for handling various basic system services and for performing hardware dependent tasks;

a network communication module 1018 that is used for connecting the analytics system 140 to other computers such as the clients 110 (used by the web analyst or a regular website user) and the web servers 120 via the communication network interfaces 1004 (wired or wireless) and one or more communication networks, such as the Internet, other wide area networks, local area networks, metropolitan area networks, and so on;

one or more log processors 150 for processing the web traffic data received from the web servers 120 and the clients 110 into sessionized data records stored in the hits database 155;

one or more aggregation servers 160 for aggregating the different metrics of the sessionized data into the aggregated data in the aggregates database 165;

one or more time series gathering servers 170 for organizing the different aggregated metrics data in the aggregates database 165 into time series in the time series database 175; in some embodiments, the time series gathering servers 170 include a time series update module 1020 for updating the time series with the aggregated data updates received from the aggregates database 165;

one or more event detection servers 180 for detecting events of potential interest in the time series stored in the time series database 175; in some embodiments, the event detection servers 180 include an event detection module 1022, a model prediction module 1024 for making predictions based on the time series, and an alert detection module 1026 for identifying events in the time series that triggers one or more alert rules in the alert rules database 195; in some embodiments, the model prediction module 1024 further includes one or more parameters 1024-1 such as $\alpha, \gamma$ in the double exponential smoothing, a linear regression sub-module 1024-2, a Holt-Winters exponential smoothing sub-module 1024-3, as well as other models 1024-4;

a query processor 190 for querying the databases associated with the analytics system 140 in response to user requests from clients 110 and providing analytics reports to the clients 110 based on the query results; in some embodiments, the query processor 190 further includes a server application 194 that includes a query module 1030 for converting client requests into one or more queries or data filters and a response module 1032 for preparing analytics reports based on the response from the different databases;

a hits database 155 for storing sessionized web analytics data;

an aggregates database 165 for storing the aggregated metric data and their associated conditions;

a time series database 175 for storing the time series extracted from the aggregates database 165;

an events database 185 for storing the events of potential interest identified in the time series; and an alert rules database 195 for storing user-specified alert definitions; in some embodiments, the alert rules database 195 includes one or more alert rule definitions such as the alert rule A 1034-1 including the associated metric(s) 1034-2 and the condition(s) 1034-3, the alert rule B 1034-4, etc.

Each of the above-identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 912 and 1012 may store a subset of the modules and data structures identified above. Furthermore, memory 912 and 1012 may store additional modules and data structures not described above.

FIGS. 9 and 10 are intended more as functional descriptions of the various features of a client device and analytics system rather than a structural schematic of the embodiments described herein. In practice, and as recognized by those of ordinary skill in the art, items shown separately could be combined and some items could be separated. For example, some items shown separately in FIG. 10 like the query processor 190 and the server application 194 as well as items like the databases 155 to 195 could be implemented by one or more servers. The actual number of server computers used to implement the analytics system 140, and how features are allocated among them will vary from one implementation to another, and may depend in part on the amount of data traffic that the system must handle during peak usage periods as well as during average usage periods.

FIGS. 11A to 11C are screenshots of graphical user interfaces that display daily, weekly, and monthly events of potential interest, respectively, in accordance with some embodiments.

In particular, FIG. 11A depicts a daily alerts graphical user interface 1102 during a 30-day period from Sep. 15, 2009 to Oct. 15, 2009. To access this user interface, a user clicks the "Intelligence" entry 1100 on the left side of the interface. There are three levels of alerts in the "Intelligence" entry 1100, "Daily Alerts," "Weekly Alerts," and "Monthly Alerts." In some embodiments, the user interface by default displays the daily alerts when the user clicks the entry 1100. Below the daily visits curve 1101 is a bar chart 1104 illustrating the respective total number of events of potential interest during the 30-day period, each day occupying one clickable spot in the bar chart 1104. In some embodiments, the user interface automatically focuses on the entry on the far right of the bar chart, which corresponds to the current date, Oct. 15, 2009. But a user can click on other parts of the bar chart 1104 to investigate the alert information for any other day within the last 30 days. Note that, at the current sensitivity level 1112, the total number of events 1106 for the date of Oct. 15, 2009 (referred to as "alerts" in the figure) is zero. In other words, the analytics system 140 does not identify any anomalous user activity patterns for that day under the current sensitivity level 1112. As a result, the custom alerts region 1108, which is associated with the "Custom Alerts" checkbox 1103 and used for displaying those alert rule-based events, and the automatic alerts region 1110, which is associated with the "Automatic Alerts" checkbox 1105 and used for displaying those model-based events, are both empty. Note that a deselection of either checkboxes 1103 or 1105 removes the corresponding alert regions 1108 or 1110 from the graphical user interface.

FIG. 11B depicts a weekly alerts graphical user interface 1120 for the past five weeks from Sep. 13, 2009 to Oct. 15, 2009, e.g., after a user selection of the "Weekly Alerts" link 1124 on the left of the user interface. By default, the current week of Oct. 11-15, 2009 is highlighted in the user interface. A user can click on the bar chart below the curve 1122 to select another week of data. Note that there is no alert for the current week including Oct. 15, 2009 because it is not over yet and the forecasting of the present application is for the most recently completed week. Compared with the curve 1101 in FIG. 11A, the curve 1122, which corresponds to roughly the same period of time, is smoother because, as explained above, the weekly summation of the daily data samples acts as a low-pass filter. As a result, the number of weekly alerts during each week is typically smaller than the sum of daily alerts during the same week. This also applies to the monthly alert described below in connection with FIG. 11C. This user interface is similar to the one shown in FIG. 11A except that the total numbers of data samples as shown in the curve 1122 drop from 30 (which corresponds to the last 30 days from Sep. 15, 2009 to Oct. 15, 2009) to 5 (which corresponds to the last five weeks from Sep. 13, 2009 to Oct. 15, 2009). In this example, the number of alerts for the week of Oct. 11-15, 2009 remains to be zero under the current sensitivity level.

FIG. 11C depicts a monthly alerts graphical user interface 1140 for the past 12 months from Oct. 1, 2008 to Oct. 15, 2009, after a user selection of the "Monthly Alerts" 1144 on the left. This user interface is similar to the one shown in FIG. 11A except that the total numbers of data samples as shown in the curve 1142 drop from 30 to 12. In this example, the number of alerts for the month of Oct. 1-15, 2009 remains to be zero under the current sensitivity level.

FIGS. 12A to 12E are screenshots of graphical user interfaces that displays information relating to events of potential interest in accordance with some embodiments.

Figure 12A:
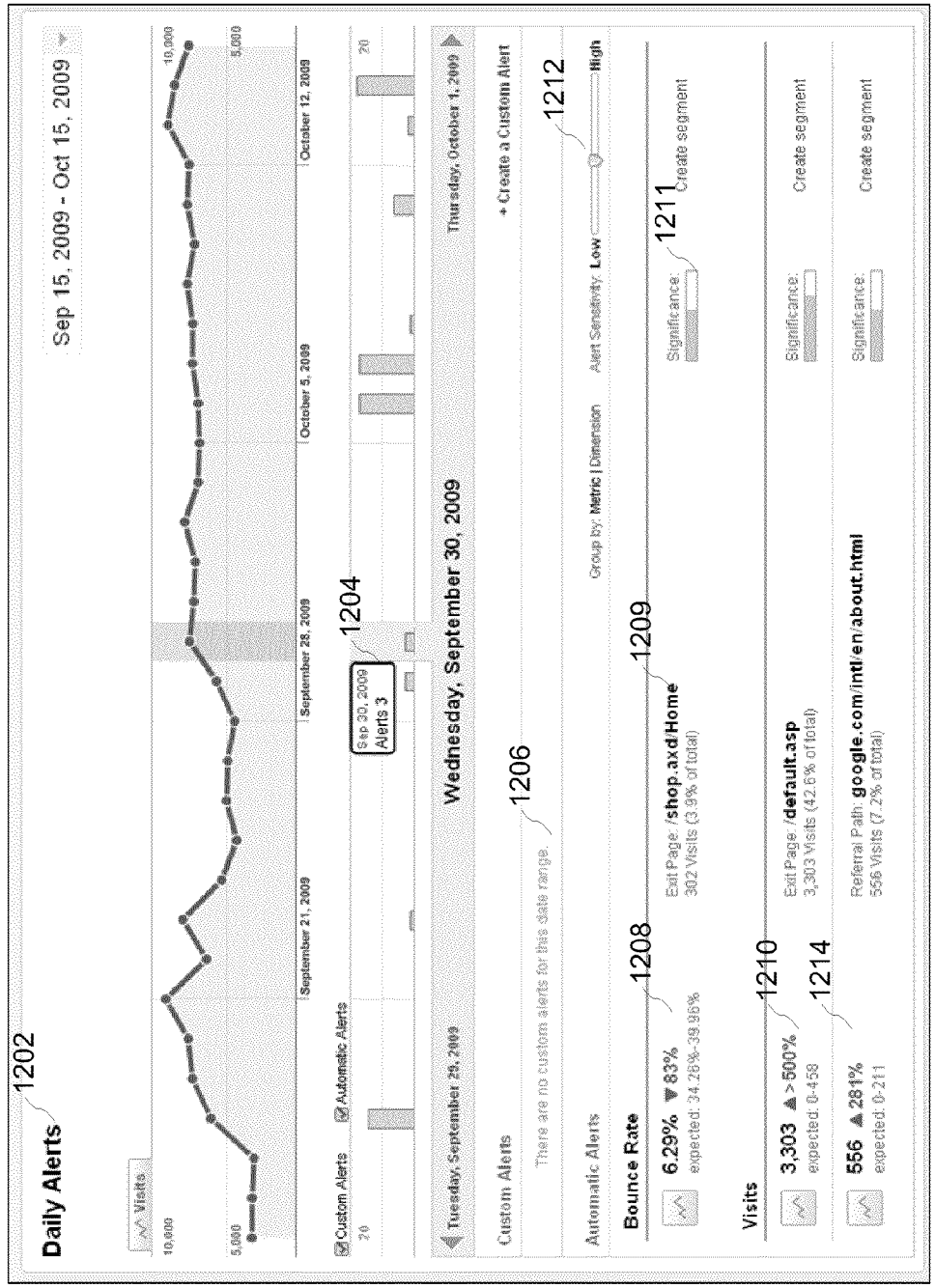

FIG. 12A depicts the same daily alerts 1102 shown in FIG. 11A but at a different date, Sep. 30, 2009. According to this daily alerts 1202, the number of alerts 1204 on Sep. 30, 2009 at the current sensitivity level 1212 is three. Note that the custom alerts region 1206 is empty and all the three alerts are model-based automatic alerts. In particular, one of the alerts 1208 suggests a significant (83%) drop of bounce rate for visits that exit from a particular web page 1209 from the expected range of 34.26%-39.96% to 6.29%. A visual indication 1211 of the alert's significance factor is also shown in the same row, indicating how unlikely this alert is under a normal situation. Two alerts 1210, 1214 are grouped together under the label "Visits." Note that although these two alerts are both related to the number of visits to the website (in this case, www.googlestore.com), they have different conditions and therefore have different meanings. The alert 1210 indicates that the number of visits to the website that exit the website from the web page www.googlestore.com/default.asp" during Sep. 30, 2009 increased more than 500% when compared with the median value derived from the multiple prediction models. The expected range from 0 to 458 is determined using the method described above in connection with FIGS. 7A and 7B.

In contrast, the alert 1214 indicates that the number of visits to the website that were referred to the website from the web page "www.google.com/intl/en/about.html" during Sep. 30, 2009 increased more than 281% when compared with the median value derived from the multiple prediction models. This may be because that the referral web page has a link to the website www.googlestore.com and many users who visit Google's website found that link and then clicked it through.

In some other embodiments, the reference value used for measuring the percentage may be the actual value of the immediately preceding time period, the averaged actual value derived from multiple time periods in the past, the mean of the expected range or other reference values that are well-known in the art.

Figure 12B:
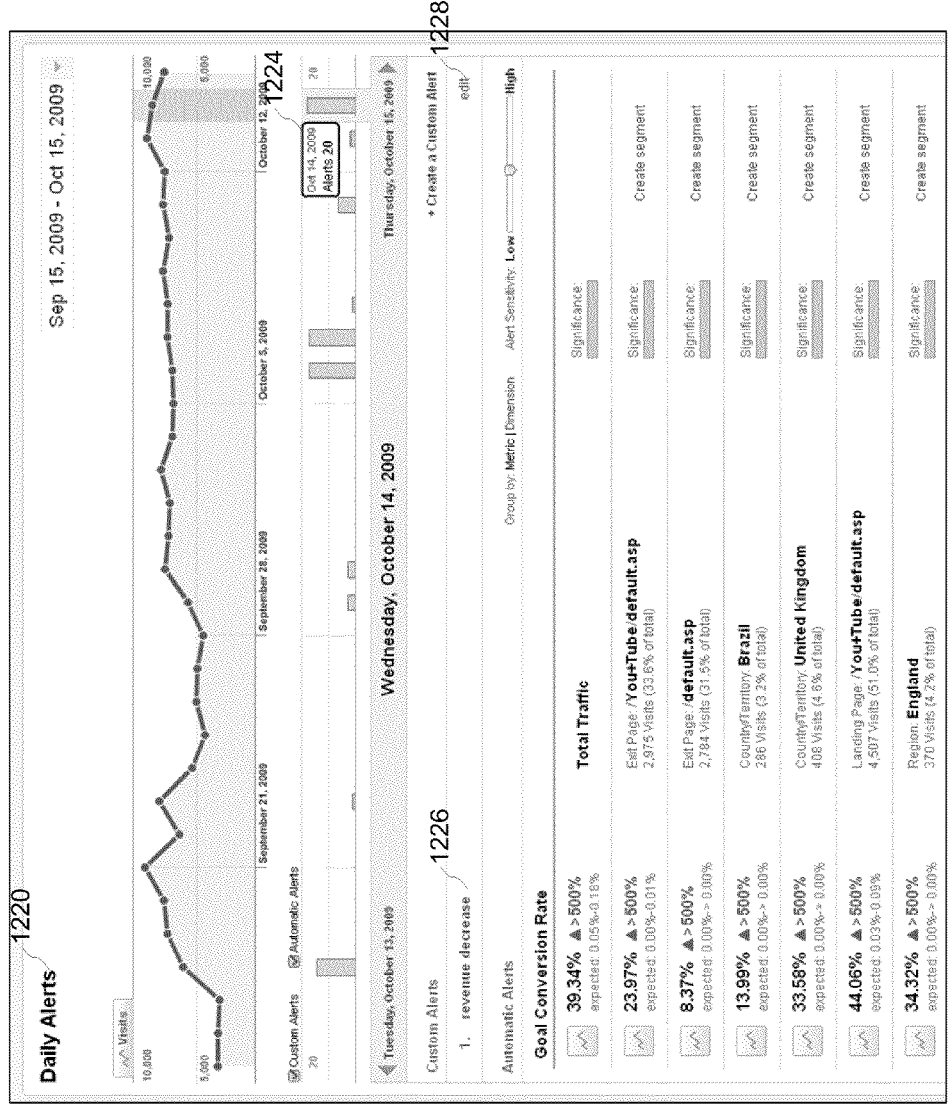

FIG. 12B depicts a graphical user interface 1220 when the user-selected date moves from Sep. 30, 2009 to Oct. 14, 2009. Note that the number of alerts for the new dates increases to 20. Moreover, one of the 20 alerts is a custom alert 1226 called "revenue decrease." A user selection of the edit link 1228 brings up the definition of the custom alert as shown in FIG. 12E. According to the definition, this alert is triggered when the revenue from all traffic to the website drops more than 10% from the same day of the previous week. In other words, the revenue on Oct. 14, 2009 is less than 90% of the revenue on Oct. 7, 2009.

Figure 12C:

FIG. 12C depicts the same user interface after a user selection of the curve link 1248 next to the first automatic alert 1244, which indicates a dramatic increase of goal conversion rate of the total traffic. As shown by the curve 1246, the rate was almost zero for the entire month until a sudden jump on Oct. 14, 2009. This curve also explains how the jump is detected as an alert. Using this alert as a lead, the web analyst can investigate the type of traffic on the same date and research what triggers the sudden jump of goal conversion rate.

Figure 12D:
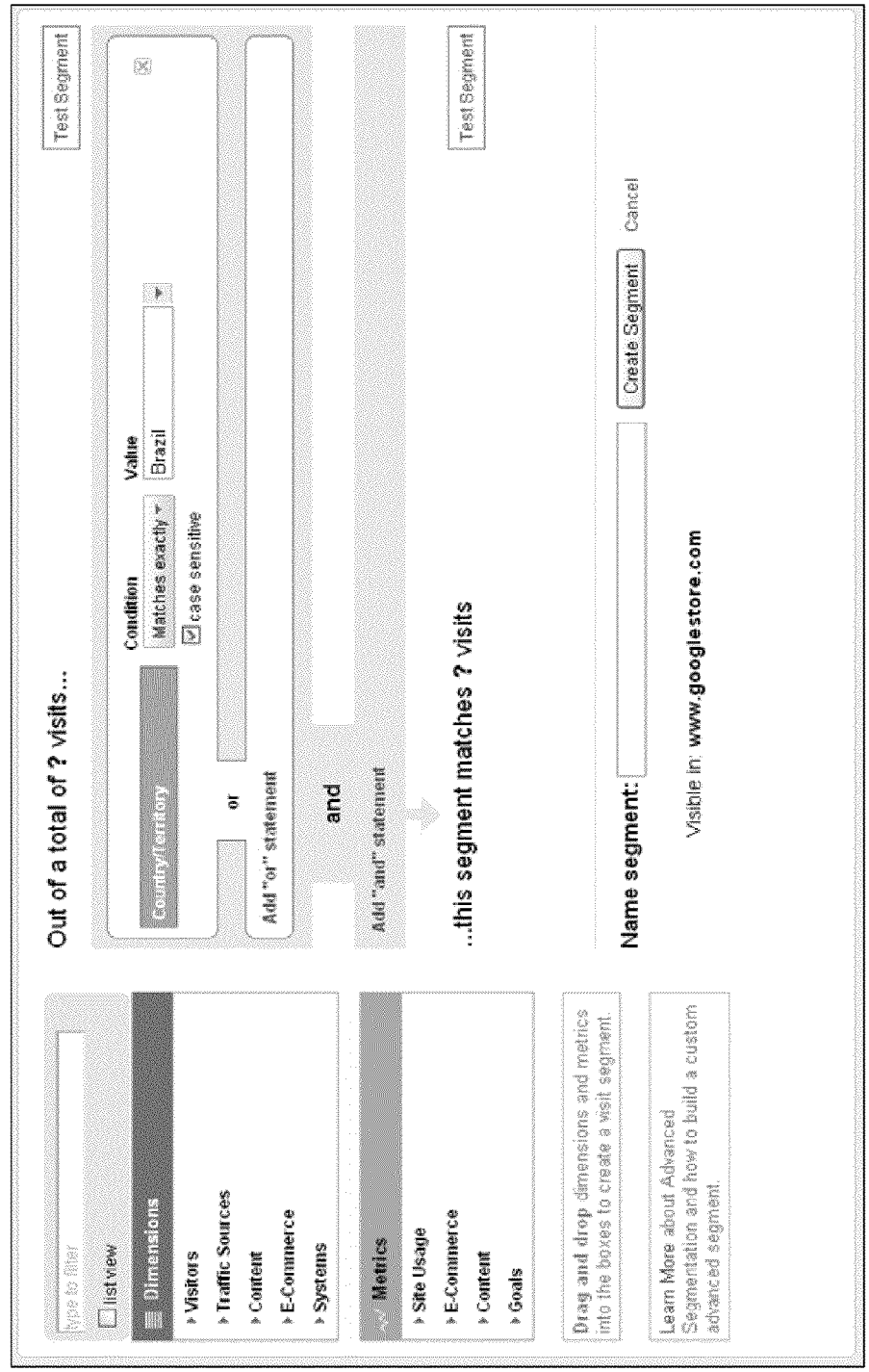

FIG. 12D depicts a graphical user interface for defining a dataset segment scheme in response to a user selection of the "Create segment" link 1242 in FIG. 12C. A more detailed description of the dataset segment scheme can be found in the pending U.S. patent application Ser. Nos. 12/575,435 and 12/575,437, both of which are incorporated into this application by reference in their entirety. Note that this feature allows a user to revisit the dataset through the same visualization angle in the future without relying on the events report, which is very useful for helping a user to understand the dataset.

Figure 13A:
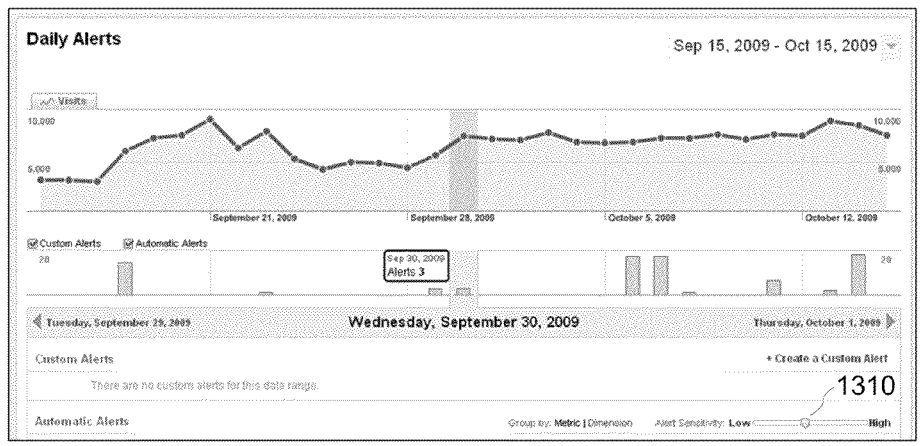
FIGS. 13A to 13C are screenshots of graphical user interfaces that display different numbers of events of potential interest based on a respective user-specified sensitivity threshold in accordance with some embodiments.
Figure 13B:
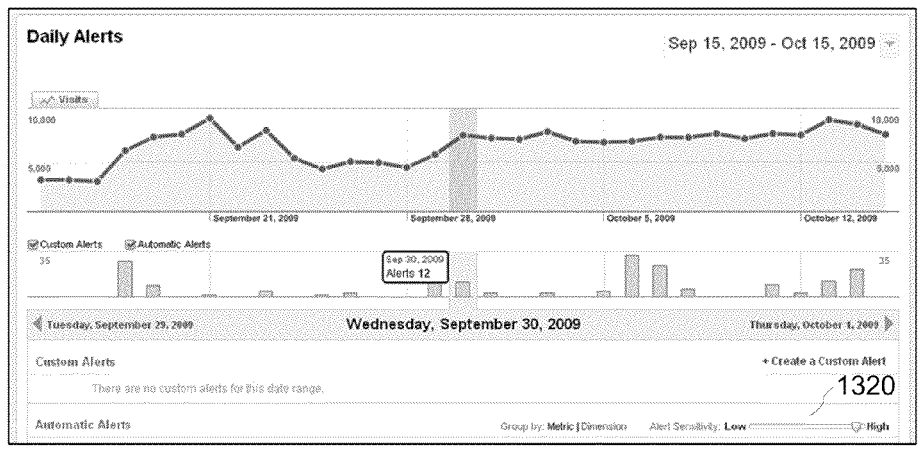
Figure 13C:
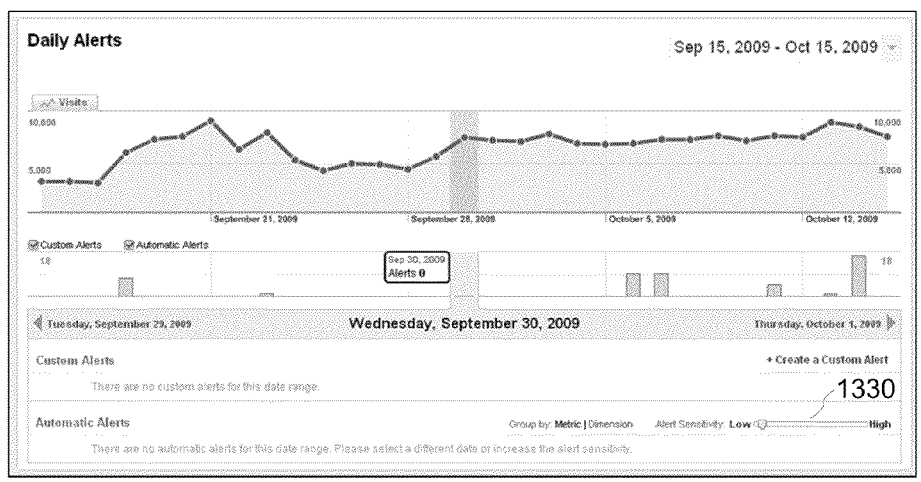

FIGS. 13A to 13C are screenshots of graphical user interfaces that display different numbers of events of potential interest based on a respective user-specified sensitivity threshold in accordance with some embodiments.

FIG. 13A depicts the alerts bar chart when the sensitivity level is about in the middle level 1310. FIG. 13B depicts the alerts bar chart when the sensitivity level reaches the highest level 1320. In this case, the analytics system 140 reports not only more (12 of FIG. 13B vs. 3 of FIG. 13A) alerts or events of potential interest for the same date, Sep. 30, 2009, but also one or more alerts for many other dates that have no alerts reported in FIG. 13A. By contrast, FIG. 13C depicts the alerts bar chart when the sensitivity level reaches the lowest level 1330. In this case, the analytics system 140 reports zero alert for the same date, Sep. 30, 2009.

Figures 14A, 14B:
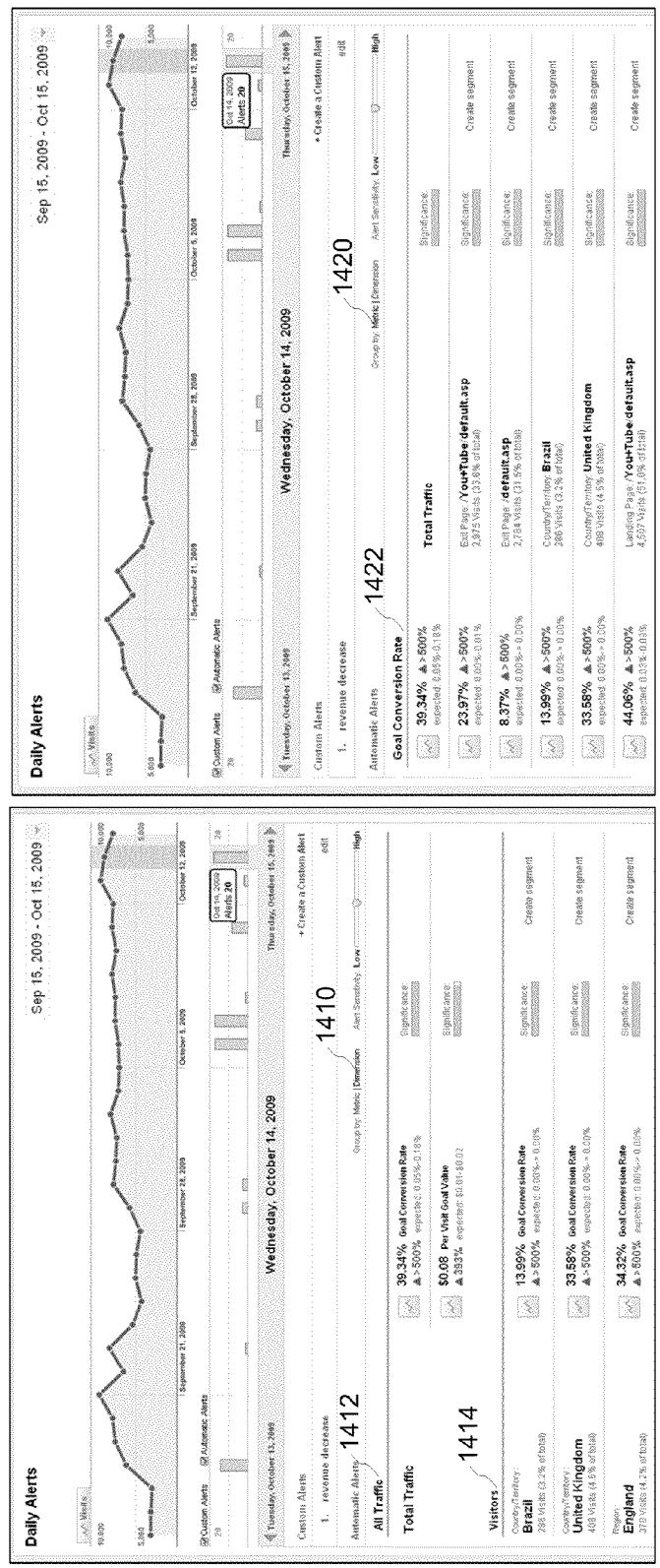
FIGS. 14A and 14B are screenshots of graphical user interfaces that display events of potential interest based on a respective user-specified organization manner in accordance with some embodiments.

FIGS. 14A and 14B are screenshots of graphical user interfaces that display events of potential interest based on a respective user-specified organization manner in accordance with some embodiments. In particular, FIG. 14A depicts a graphical user interface in which the alerts are displayed in an order defined by dimension 1410 such as the All Traffic 1412 and the Visitor 1414 and then by different metrics within the same dimension. FIG. 14B depicts a graphical user interface in which the alerts are displayed in an order defined by metric 1420 such as the Goal Conversion Rate 1422 and then by different dimensions within the same metric.

Figure 15A:
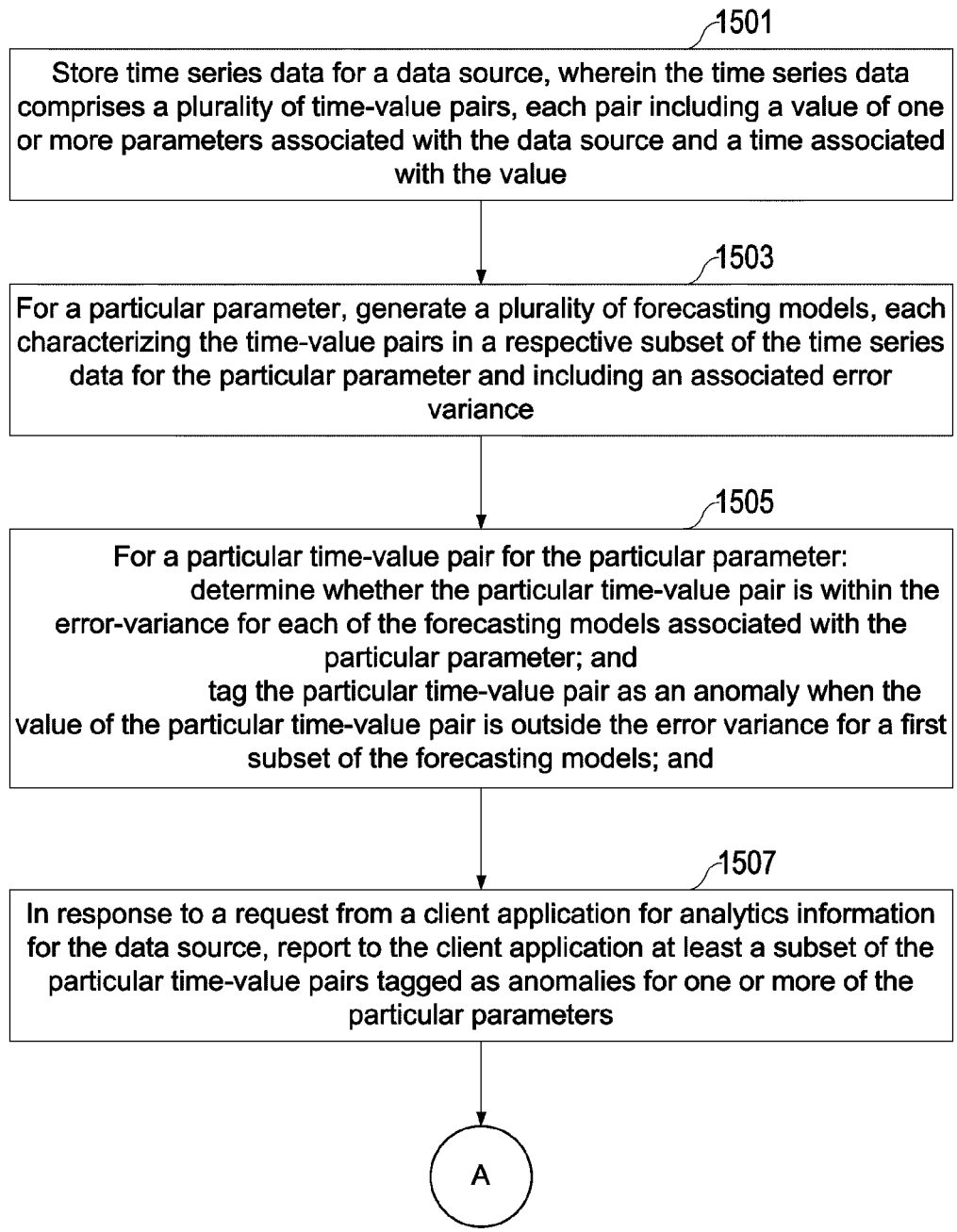
FIGS. 15A and 15B depict a flow chart of a method for identifying anomalies in time series data in accordance with some embodiments.

FIG. 15A depicts a flow chart of a method for identifying anomalies in time series data in accordance with some embodiments. At a server system with a processor and memory, the server system stores time series data for a data source (1501). The time series data comprises a plurality of time-value pairs, each pair including a value of one or more attributes associated with the data source and a time associated with the value.

For a particular attribute, the server system generates a plurality of forecasting models for characterizing the time-value pairs in a respective subset of the time series data (1503). In some embodiments, each forecasting model includes an estimated attribute value and an associated error-variance.

For a respective time-value pair associated with the particular attribute, the server system determines whether the value of the time-value pair is within the error-variance of the corresponding estimated attribute value and tags the time-value pair as an anomaly if the value of the time-value pair is outside the error variance for at least a first subset of the forecasting models (1505).

Finally, in response to a request from a client application for analytics information for the data source, the server system reports to the client application at least a subset of the time-value pairs tagged as anomalies for one or more of the attributes (1507).

In some embodiments, the respective time-value pair for the particular attribute is the latest time-value pair from the data source. The first subset of the forecasting models comprises one of: a predetermined number of the forecasting models or a predetermined fraction of the forecasting models.

Figure 15B:
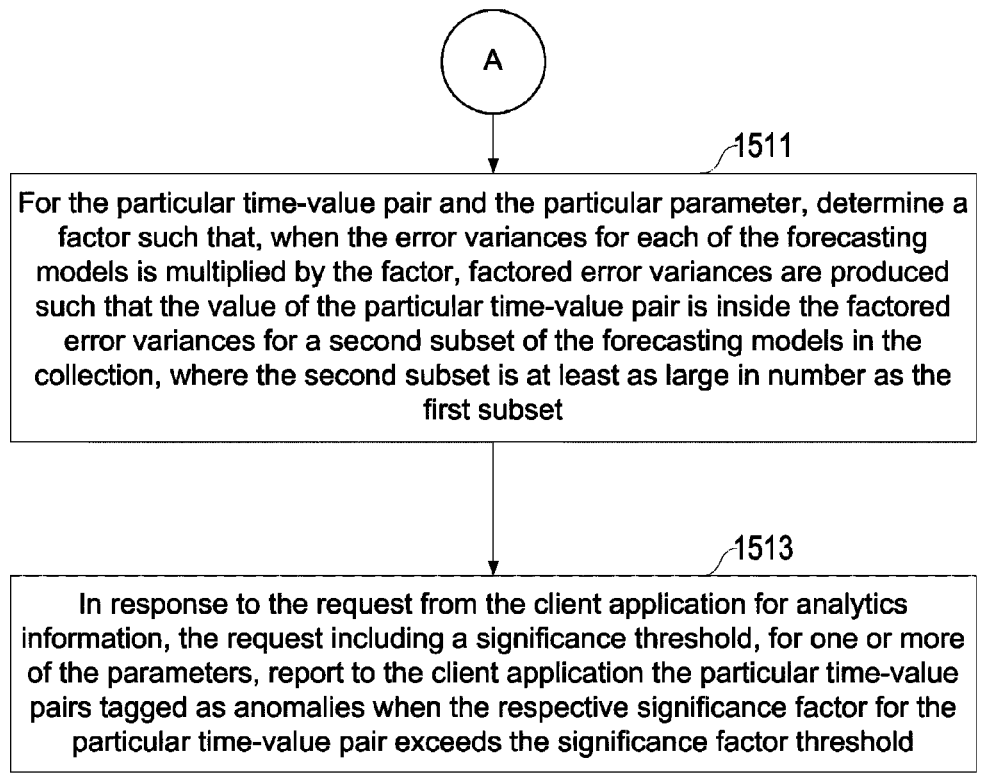

As shown in FIG. 15B, for the respective time-value pair and the particular attribute, the server system determines a significance factor (1511). In some embodiments, the significance factor is chosen such that, when the error-variance for each of the forecasting models is multiplied by the significance factor, the value of the time-value pair is inside the factored error-variance of a corresponding estimated metric value for at least a second subset of the forecasting models and the first subset is within the second subset.

In response to the request from the client application for analytics information that includes a significance threshold for one or more of the attributes, the server system reports to the client application those time-value pairs tagged as anomalies when the respective significance factor for each of the time-value pairs exceeds the significance threshold (1513).

In some embodiments, the forecasting models include at least one of a linear regression model and a Holt-Winters exponential smoothing model. The forecast models include models computed from 4, 21, and 56 days of time-series data.

In some embodiments, the time series data includes aggregated web analytics data, the method further comprising: aggregating raw or sessionized web traffic data to generate the aggregated web analytics data for attributes of interest and storing the aggregated web analytics data in addition to the raw or sessionized web traffic data. The time series data includes sessionized web analytics data, the method further comprising summarizing per session raw web traffic data to generate the sessionized time series data for one or more of the attributes storing the sessionized time series data in addition to the raw web traffic data.

Figure 16A:
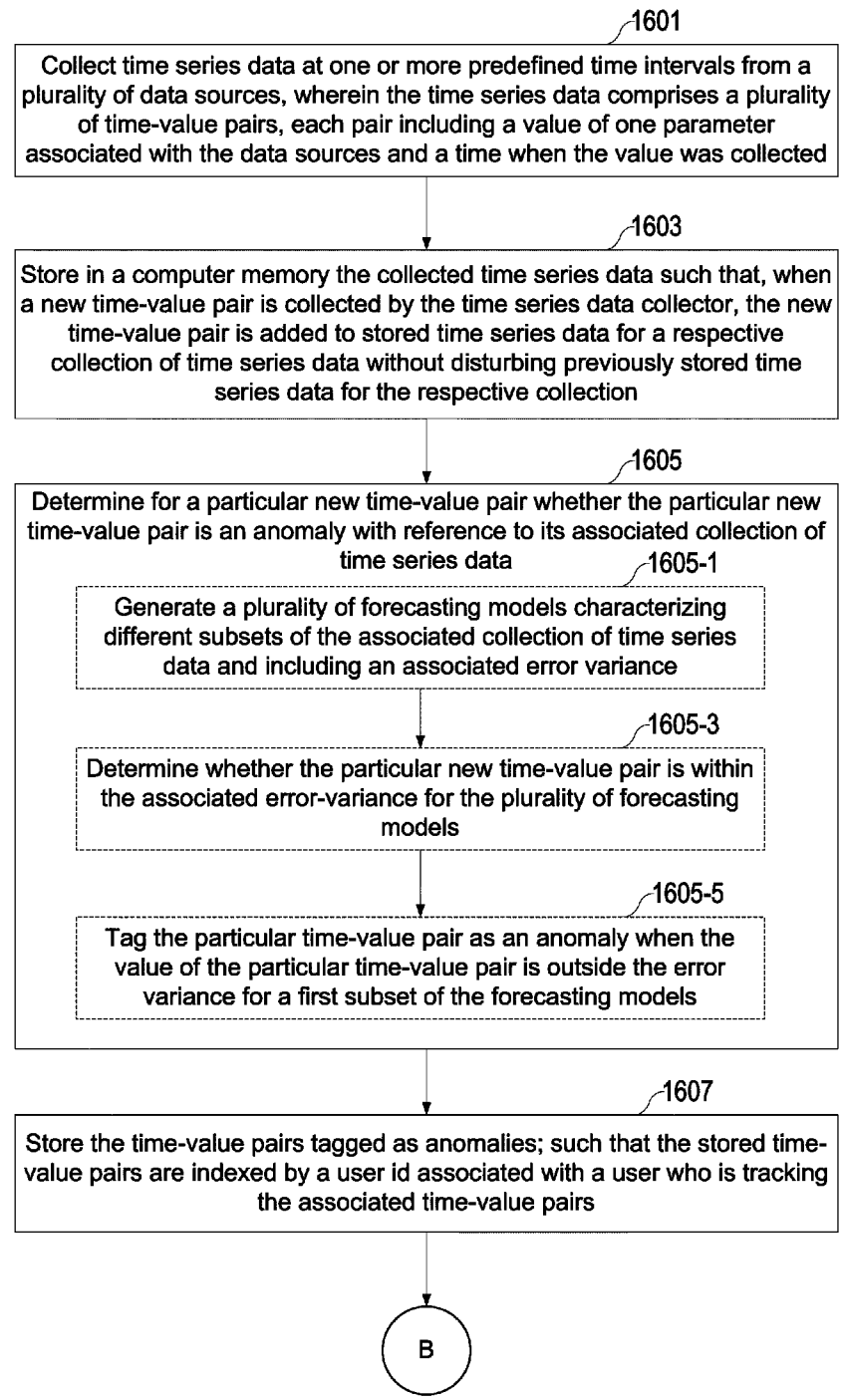
FIGS. 16A and 16B depict another flow chart of a method for identifying anomalies in time series data implemented by different components of a server system with a processor and memory in accordance with some embodiments.

FIG. 16A depicts another flow chart of a method for identifying anomalies in time series data implemented by different components of a server system with a processor and memory in accordance with some embodiments.

A time series data collector of the server system is configured to collect time series data at one or more predefined time intervals from a plurality of data sources (1601). In some embodiments, the time series data comprises a plurality of time-value pairs, each pair including a value of one attribute associated with the data sources and a time when the value was collected.

A time series storage module of the server system is configured to store the collected time series data in a computer memory such that, when a new time-value pair is collected by the time series data collector, the new time-value pair is added to the stored time series data for a respective collection of time series data without disturbing the previously stored time series data for the respective collection (1603).

For a particular new time-value pair, an anomaly detection module of the server system is configured to determine whether the particular new time-value pair is an anomaly with reference to its associated collection of time series data (1605). In some embodiments, this operation further includes: generating a plurality of forecasting models characterizing different subsets of the associated collection of time series data (1605-1), each forecasting model including an estimated attribute value and an associated error-variance; determining whether the particular new time-value pair is within the associated error-variance for each of the plurality of forecasting models (1605-3); and tagging the particular time-value pair as an anomaly when the value of the particular time-value pair is outside the error-variance for at least a first subset of the forecasting models (1605-5).

Next, an anomaly storage module of the server system is configured to store the time-value pairs tagged as anomalies such that the stored time-value pairs are ready to be served to a user at a client application in response to a user request for the anomalies.

Figure 16B:
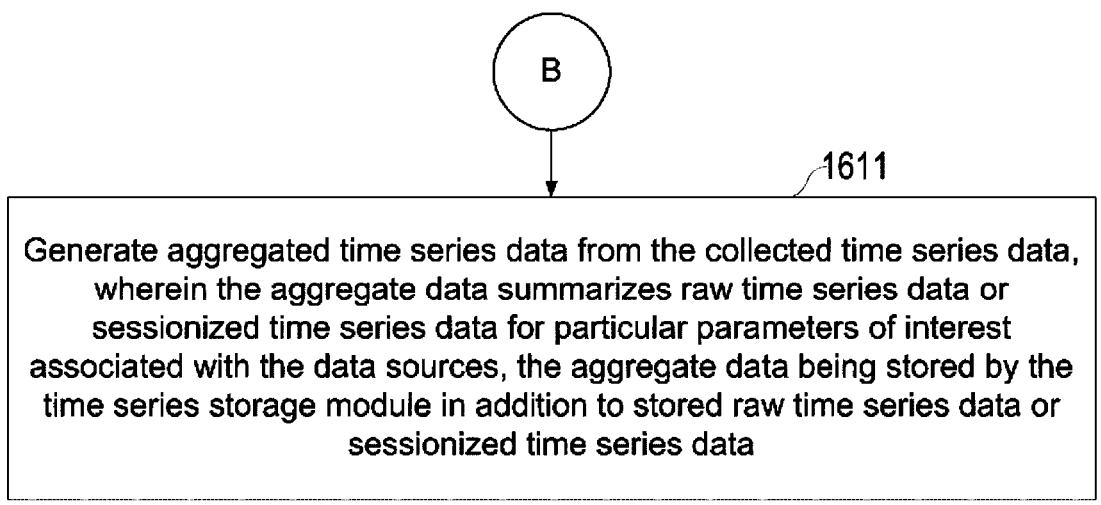

In some embodiments shown in FIG. 16B, the server system also includes an aggregation module configured to generate aggregated time series data from the collected time series data (1611). The aggregate time series summarizes raw time series data or sessionized time series data for particular attributes of interest associated with the data sources, the aggregate data being stored by the time series storage module in addition to stored raw time series data or sessionized time series data.

In some embodiments, the anomaly detection mechanism operates solely on the aggregated time series data generated by the aggregation module. The data sources are web pages stored on web servers and the collected time series data comprises values of metrics and dimensions for the web pages and associated time values when the values of the metrics and dimensions were collected. The predefined time intervals are no longer than a day.

In some embodiments, the time series storage module is further configured to quantize and compress the time series data before storing it so as to save more space.

In some embodiments, the collection of time series data includes a number of time-value pairs that is used for generating the plurality of forecasting models and the forecasting models include at least one of a linear regression model and a Holt-Winters exponential smoothing model.

Figure 17A:
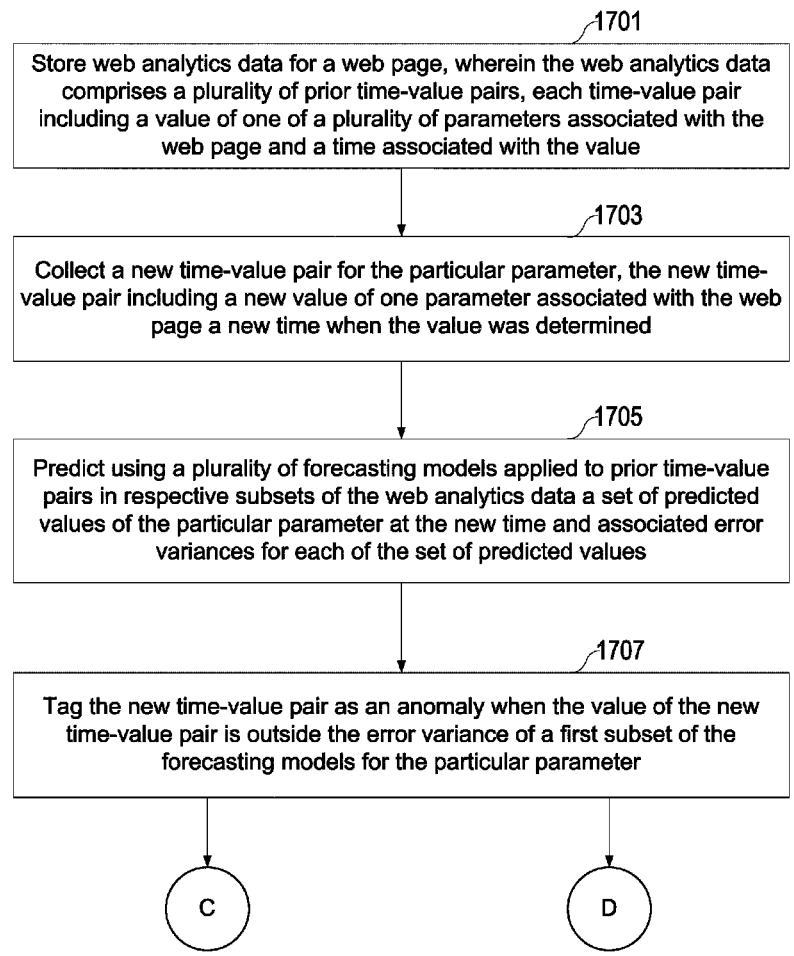
FIGS. 17A to 17C depict another flow chart of a method for detecting anomalies in web analytics data implemented at a server system in accordance with some embodiments.

FIG. 17A depicts another flow chart of a method for detecting anomalies in web analytics data implemented at a server system in accordance with some embodiments.

The server system stores web analytics data for a web page in a device (1701). In some embodiments, the web analytics data comprises a plurality of prior time-value pairs, each time-value pair including a value of one of a plurality of attributes associated with the web page and a time associated with the value. The server system collects a new time-value pair for the particular attribute (1703). The new time-value pair includes a new value associated with the web page and a new time when the value was determined.

For each of the set of predicted values, the server system estimates a set of predicted values for the attribute and associated error-variances at the new time by applying a plurality of forecasting models to the plurality of prior time-value pairs in respective subsets of the web analytics data (1705).

Finally, the server system tags the collected new time-value pair as an anomaly when the value of the new time-value pair is outside the error variance of each of a first subset of the forecasting models for the particular attribute (1707).

Figure 17B:
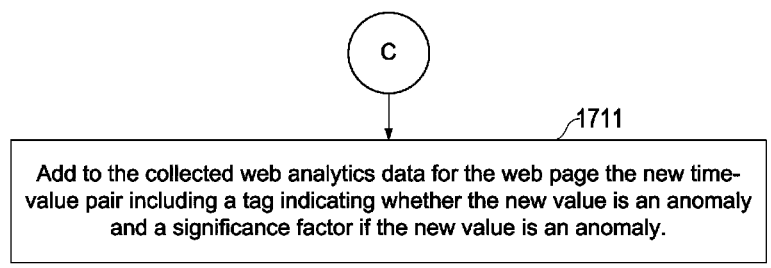

FIG. 17B depicts that the server system adds to the collected web analytics data for the web page the new time-value pair (1711). The time-value pair includes a tag indicating whether the new value is an anomaly and a significance factor if the new value is an anomaly.

Figure 17C:
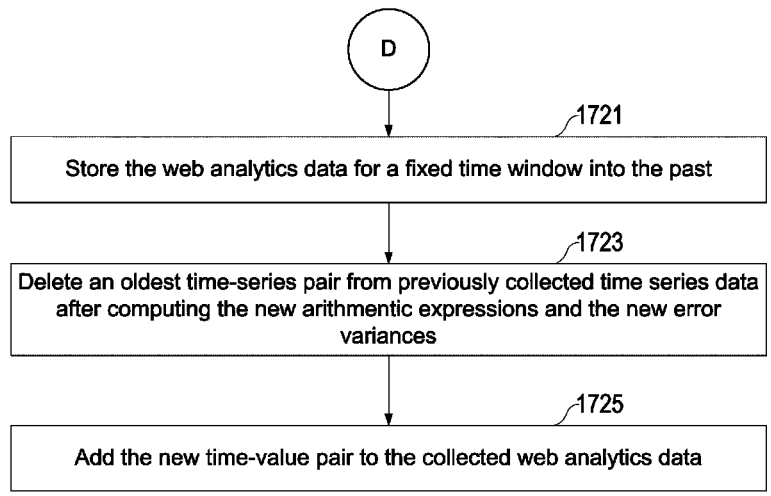

FIG. 17C depicts that the server system storing the web analytics data for a fixed time window into the past (1721). After estimating the set of predicted values and associated error-variances for the attribute at the new time, the server system deletes one or older time-value pairs from previously collected time series data (1723) and appends the new time-value pair to the end of the collected web analytics data (1725).

In some embodiments, the attributes comprise a plurality of metrics and dimensions associated with the web site.

As shown in FIGS. 11A to 11C, the graphical user interface for presenting time series data and anomalies for a data source includes a first window and a second window below the first window.

In some embodiments, the first window includes a graph of time series data values for a first attribute for the data source, the graph having a time axis corresponding to a time range and a dependent data value axis, and a histogram of anomalies for the data source, with the same time axis scale as the graph and a dependent total anomalies axis. Note that the height of a respective bar along the total anomalies axis in the histogram represents the total number of anomalies for the web site at a particular day.

The second window includes a list of items characterizing a set of anomalies at a particular time on the time axis, each item corresponding to an anomaly associated with a respective attribute for the data source, a value of the respective attribute at the particular time, and a significance factor of the anomaly, and a user-interactive object for adjusting a sensitivity threshold associated with the first window and the second window.

As further depicted in FIGS. 13A to 13C, in response to a user adjustment of the sensitivity threshold through the user-interactive object, a new histogram of anomalies for the data source is rendered to replace the existing histogram of anomalies for the data source in the first window. In addition, a new list of items characterizing a new set of anomalies at the particular time is rendered to replace the existing list of items.

Although some of the various drawings illustrate a number of logical stages in a particular order, stages which are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer-implemented method for identifying events of interest in web analytics data, comprising:
 at a computer server having one or more processors and memory for storing programs to be executed by the one or more processors:
  storing web analytics data for a web page in a device, wherein the web analytics data comprises a plurality of prior time-value pairs, each time-value pair including a value of one of a plurality of attributes associated with the web page and a time associated with the value;
  collecting a new time-value pair for the particular attribute, the new time-value pair including a new value associated with the web page and a new time when the value was determined;

estimating a predicted value for the attribute and associated error-variance at the new time for the predicted value by applying a forecasting model to the plurality of prior time-value pairs in respective subsets of the web analytics data; and tagging the collected new time-value pair if the value of the new time-value pair is outside the error variance of the predicted value of the forecasting model for the particular attribute;

adding to the collected web analytics data for the web page the new time-value pair including a tag indicating whether the new value is an anomaly and a significance factor if the new value is an anomaly, wherein the significance factor is associated with the error variance of the predicted value of the forecasting model;

for the new time-value pair and the particular attribute, determining the significance factor such that, when the error-variance is multiplied by the significance factor, the value of the time-value pair is inside the factored error-variance of the predicted value; and in response to a request from a client application for analytics information, the request including a significance threshold for one or more of the attributes, reporting to the client application the new time-value pair if the significance factor for the time-value pair exceeds the significance threshold.

2. The computer-implemented method of claim 1, further comprising: storing the web analytics data for a fixed time window into the past;

deleting one or more oldest time-value pairs from previously collected time series data after estimating the predicted value and the associated error-variances; and appending the new time-value pair to the end of the collected web analytics data.

3. The computer-implemented method of claim 1, wherein the attributes comprise a plurality of metrics and dimensions associated with the web site.

4. The computer-implemented method of claim 1, wherein the forecasting model is selected from a plurality of forecasting models that include at least one of a linear regression model and a Holt-Winters exponential smoothing model.

5. The computer-implemented method of claim 1, wherein the web analytics data includes aggregated web analytics data, the computer-implemented method further comprising: aggregating raw or sessionized web traffic data to generate the aggregated web analytics data for attributes of interest and storing the aggregated web analytics data in addition to the raw or sessionized web traffic data.

6. A server system for identifying anomalies in web analytics data, wherein the server system is connected to one or more client devices through a network, comprising:

one or more processors for executing programs; and memory to store data and to store one or more programs to be executed by the one or more processors, the one or more programs including instructions for:

storing web analytics data for a web page in a device, wherein the web analytics data comprises a plurality of prior time-value pairs, each time-value pair including a value of one of a plurality of attributes associated with the web page and a time associated with the value;

collecting a new time-value pair for the particular attribute, the new time-value pair including a new value associated with the web page and a new time when the value was determined;

estimating a predicted value for the attribute and associated error-variance at the new time for the predicted value by applying a forecasting model to the plurality of prior time-value pairs in respective subsets of the web analytics data;

tagging the collected new time-value pair if the value of the new time-value pair is outside the error variance of the predicted value of the forecasting model for the particular attribute;

adding to the collected web analytics data for the web page the new time-value pair including a tag indicating whether the new value is an anomaly and a significance factor if the new value is an anomaly, wherein the significance factor is associated with the error variance of the predicted value of the forecasting model;

for the new time-value pair and the particular attribute, determining the significance factor such that, when the error-variance is multiplied by the significance factor, the value of the time-value pair is inside the factored error-variance of the predicted value; and in response to a request from a client application for analytics information, the request including a significance threshold for one or more of the attributes, reporting to the client application the new time-value pair if the significance factor for the time-value pair exceeds the significance threshold.

7. The server system of claim 6, further comprising instructions for: storing the web analytics data for a fixed time window into the past;

deleting one or more oldest time-value pairs from previously collected time series data after estimating the predicted value and the associated error-variances; and appending the new time-value pair to the end of the collected web analytics data.

8. The server system of claim 6, wherein the attributes comprise a plurality of metrics and dimensions associated with the web site.

9. The server system of claim 6, wherein the forecasting model is selected from a plurality of forecasting models that include at least one of a linear regression model and a Holt-Winters exponential smoothing model.

10. A non-transitory computer readable-storage medium storing one or more programs for execution by one or more processors, the one or more programs comprising instructions for:

storing web analytics data for a web page in a device, wherein the web analytics data comprises a plurality of prior time-value pairs, each time-value pair including a value of one of a plurality of attributes associated with the web page and a time associated with the value;

collecting a new time-value pair for the particular attribute, the new time-value pair including a new value associated with the web page and a new time when the value was determined;

estimating a predicted value for the attribute and associated error-variance at the new time for the predicted value by applying a forecasting model to the plurality of prior time value pairs in respective subsets of the web analytics data; and tagging the collected new time-value pair if the value of the new time-value pair is outside the error variance of the predicted value of the forecasting model for the particular attribute;

adding to the collected web analytics data for the web page the new time-value pair including a tag indicating whether the new value is an anomaly and a significance factor if the new value is an anomaly, wherein the significance factor is associated with the error variance of the predicted value of the forecasting model for the new time-value pair and the particular attribute, determining the significance factor such that, when the error-variance is multiplied by the significance factor, the value of the time-value pair is inside the factored error-variance of the predicted value; and in response to a request from a client application for analytics information, the request including a significance threshold for one or more of the attributes, reporting to the client application the new time-value pair if the significance factor for the time-value pair exceeds the significance threshold.

11. The non-transitory computer readable-storage medium of claim 10, further comprising instructions for:

storing the web analytics data for a fixed time window into the past;

deleting one or more oldest time-value pairs from previously collected time series data after estimating the predicted value and the associated error-variances; and appending the new time-value pair to the end of the collected web analytics data.

12. The non-transitory computer readable-storage medium of claim 10, further comprising instructions for:

for the new time-value pair and the particular attribute, determining the significance factor such that, when the error-variance is multiplied by the significance factor, the value of the time-value pair is inside the factored error-variance of the predicted value; and in response to a request from a client application for analytics information, the request including a significance threshold for one or more of the attributes, reporting to the client application new time-value pair if the significance factor for the time-value pairs exceeds the significance threshold.

13. The non-transitory computer readable-storage medium of claim 10, wherein the forecasting model is selected from a plurality of forecasting models that include at least one of a linear regression model and a Holt-Winters exponential smoothing model.

14. A computer-implemented method for identifying events in web analytics data, comprising:

at a computer server having one or more processors and memory for storing programs to be executed by the one or more processors:

storing web analytics data for a web page in a device, wherein the web analytics data comprises a plurality of prior time-value pairs, each time-value pair including a value of one of a plurality of attributes associated with the web page and a time associated with the value;

collecting a new time-value pair for a particular attribute, the new time-value pair including a new value associated with the web page and a new time when the value was determined;

estimating a predicted value for the attribute at the new time by applying a forecasting model to the plurality of prior time-value pairs in a respective subset of the web analytics data;

tagging the collected new time-value pair as an event of potential interest when a difference between the value of the new time-value pair and the predicted value at the new time meets a predefined condition, wherein the predefined condition comprises the value of the new time-value pair being outside a range centered at the predicted value and the range is determined, at least in part, by a significance factor associated with the forecasting model; and generating an alert for the event of potential interest when an alert condition based on the value of the new time-value pair is satisfied.

15. The method of claim 14, further comprising: estimating an error variance using the forecasting model, such that the predefined condition comprises the value of the new time-value pair being outside the error variance associated with the predicted value multiplied by the significance factor.

16. The method of claim 15, further comprising: receiving the alert condition from a web analytics client, wherein the alert condition is defined by a user of the web analytics client.

17. The method of claim 16, further comprising: issuing the alert to the web analytics client.

18. The method of claim 15, wherein the alert condition is one of the value of the new time-value pair exceeding or falling below a first predefined value or a difference between the value of the new time-value pair and the value of a prior time-value pair exceeding or falling below a second predefined value.

19. The method of claim 14, further comprising: receiving the web analytics data from a web server hosting the web page.

20. The method of claim 1, wherein:

estimating a predicted value for the attribute comprises estimating a set of predicted values for the attribute and associated error-variances at the new time for the predicted values by applying a plurality of forecasting models to the plurality of prior time-value pairs in respective subsets of the web analytics data; and tagging the collected new time-value pair comprises tagging the collected new time value pair if the value of the new time-value pair is outside the error variance of each of a first subset of the predicted values of the forecasting models for the particular attribute.

21. The method of claim 14, wherein:

estimating a predicted value for the attribute comprises estimating a set of predicted values for the attribute and associated error-variances at the new time for the predicted values by applying a plurality of forecasting models to the plurality of prior time-value pairs in respective subsets of the web analytics data; and tagging the collected new time-value pair comprises tagging the collected new time value pair if the value of the new time-value pair is outside the error variance of each of a first subset of the predicted values of the forecasting models for the particular attribute.

* * * * *